US012794551B2

(12) United States Patent
Lei et al.

(10) Patent No.: US 12,794,551 B2
(45) Date of Patent: Nov. 10, 2026

(54) MULTI-FUNCTIONAL NETWORK TESTER

(71) Applicant: Yongzhou Noyafa Electronic Co., Ltd., Yongzhou (CN)

(72) Inventors: Ming Lei, Yongzhou (CN); Jianping Zhang, Yongzhou (CN)

(73) Assignee: Yongzhou Noyafa Electronic Co., Ltd., Yongzhou (CN)

( * ) Notice: Subject to any disclaimer, the term of this patent is extended or adjusted under 35 U.S.C. 154(b) by 251 days.

(21) Appl. No.: 18/777,658

(22) Filed: Jul. 19, 2024

(65) Prior Publication Data

US 2025/0184000 A1 Jun. 5, 2025

(30) Foreign Application Priority Data

Dec. 6, 2023 (CN) ......................... 202323319101.9
Dec. 6, 2023 (CN) ......................... 202323319103.8

(51) Int. Cl.
*H04B 10/07* (2013.01)

(52) U.S. Cl.
CPC .................................... *H04B 10/07* (2013.01)

(58) Field of Classification Search
CPC ........... H04L 43/50; H04B 3/46; H04B 10/07; G01R 31/00; G01R 15/125; G01R 19/02; G01R 19/0046; G01R 19/0007; G01R 17/20; G01R 17/10; G01R 17/02; G01R 15/14; G01R 15/12; G01R 15/08; G01R 15/04; G01R 15/005; G01R 19/145;
(Continued)

(56) References Cited

U.S. PATENT DOCUMENTS

2003/0069618 A1* 4/2003 Smith, III .............. A61Q 19/06 607/91
2006/0170409 A1* 8/2006 Kagan .................... G01R 35/04 324/74

(Continued)

FOREIGN PATENT DOCUMENTS

CN 201072360 Y * 6/2008
CN 201449409 U * 5/2010

(Continued)

OTHER PUBLICATIONS

Paige Mary Pamela Khouri et al.,"Design and automation of electrical cable harnesses testing system," Mar. 24, 2021, Microelectronics Reliability 120 (2021) 114097,pp. 1-9.*

(Continued)

*Primary Examiner* — Omar S Ismail

(57) ABSTRACT

Disclosed in the present disclosure is a multi-functional network tester, including a central control module, a power module, and one or more of a network cable length measurement module, a line-finding module, a switch detection module, and a network cable line-alignment module, in which the multi-functional network tester further includes an optical power module or a multimeter module, the network cable length measurement module, the line-finding module, the switch detection module and/or the network cable line-alignment module are connected to the central control module respectively, the optical power module or the multimeter module is connected to the central control module, and the power module is used for power supply.

15 Claims, 25 Drawing Sheets

(58) Field of Classification Search

CPC ...... G01R 19/18; G01R 19/165; G01R 19/22; G01R 19/25; G01R 21/001; G01R 21/007; G01R 21/02; G01R 21/06; G01R 21/08; G01R 21/10; G01R 21/127; G01R 21/133; G01R 22/06; G01R 23/02; G01R 23/16; G01R 27/02; G01R 27/28; G01R 29/02; G01R 29/08; G01R 29/12; G01R 31/001; G01R 31/005; G01R 31/01; G01R 31/08; G01R 31/12; G01R 31/24; G01R 31/26; G01R 31/28; G01R 31/327; G01R 31/34; G01R 31/36; G01R 31/40; G01R 31/50; G01R 31/58; G01R 31/66; G01R 33/0023; G01R 33/007; G01R 33/02; G01R 33/12; G01R 33/20; G01R 35/005; G01R 35/04; G01R 13/20; G01R 13/04; G01R 13/02; G01R 13/40; G01R 11/48; G01R 11/46; G01R 11/36; G01R 11/30; G01R 11/02; G01R 9/04; G01R 7/12; G01R 7/04; G01R 5/28; G01R 5/22; G01R 5/14; G01R 5/02; G01R 1/40; G01R 1/20; G01R 1/02

See application file for complete search history.

(56) References Cited

U.S. PATENT DOCUMENTS

| | | | | |
|---|---|---|---|---|
| 2014/0032138 | A1* | 1/2014 | Shrestha | G01R 31/40 702/58 |
| 2015/0185251 | A1* | 7/2015 | Heydron | H04B 7/26 324/754.02 |
| 2019/0137566 | A1* | 5/2019 | Ormston | G01R 31/54 |
| 2023/0019522 | A1* | 1/2023 | Magers | G01R 27/28 |
| 2023/0402865 | A1* | 12/2023 | Sakakibara | G01R 31/371 |
| 2023/0411977 | A1* | 12/2023 | Hou | G01K 7/24 |

FOREIGN PATENT DOCUMENTS

| | | | | | |
|---|---|---|---|---|---|
| CN | 203148462 | U | * | 8/2013 | |
| CN | 103457787 | A | * | 12/2013 | |
| CN | 103869170 | A | * | 6/2014 | G01K 7/16 |
| CN | 203859754 | U | * | 10/2014 | H04B 3/46 |
| CN | 106569108 | A | * | 4/2017 | G01R 31/12 |
| CN | 107251185 | A | * | 10/2017 | G01R 31/52 |
| CN | 206756904 | U | * | 12/2017 | |
| CN | 107843864 | A | * | 3/2018 | G01R 35/04 |
| CN | 108459188 | A | * | 8/2018 | G01R 15/125 |
| CN | 209447558 | U | * | 9/2019 | |
| CN | 110879307 | A | * | 3/2020 | G01R 15/12 |
| CN | 210351204 | U | * | 4/2020 | |
| CN | 109188254 | B | * | 11/2020 | G01R 31/2851 |
| CN | 112649783 | A | * | 4/2021 | G01R 35/007 |
| CN | 116465445 | A | * | 7/2023 | G01D 18/00 |
| CN | 117434106 | A | * | 1/2024 | G01N 25/20 |
| CN | 117805456 | A | * | 4/2024 | G01R 31/00 |
| CN | 221978946 | U | * | 11/2024 | |
| CN | 119355327 | A | * | 1/2025 | H02J 7/35 |
| CN | 121027782 | A | * | 11/2025 | G01R 21/133 |
| JP | 2013083732 | A | * | 5/2013 | |
| KR | 20030057236 | A | * | 7/2003 | G01R 22/10 |
| KR | 101564283 | B1 | * | 11/2015 | G01R 27/00 |
| TW | 202309533 | A | * | 3/2023 | G01R 17/02 |
| WO | WO-2023210295 | A1 | * | 11/2023 | G01R 31/396 |

OTHER PUBLICATIONS

Krzysztof Lowczowski et al.,"Monitoring of MV Cable Screens, Cable Joints and Earthing Systems Using Cable Screen Current Measurements," Jul. 3, 2020, Energies 2020, 13, 3438,pp. 1-19.*

Chris J. Collins et al.,"In Situ Crosstalk Measurements of Long Cables the Multi-Network Analyzer Method," Oct. 23, 2017, 2017 IEEE International Symposium on Electromagnetic Compatibility & Signal/Power Integrity (EMCSI),pp. 339-342.*

Yuan-Pin Tsai et al. ,"Multifunctional Coreless Hall-Effect Current Transformer for the Protection and Measurement of Power Systems," Feb. 5, 2014, IEEE Transactions on Instrumentation and Measurement, vol. 63, No. 3, Mar. 2014,pp. 557-563.*

Yuxuan Song et al.,"Online multi-parameter sensing and condition assessment technology for power cables: A review," May 28, 2022, Electric Power Systems Research 210 (2022) 108140,pp. 1-10.*

* cited by examiner

MULTI-FUNCTIONAL NETWORK TESTER

CROSS REFERENCE TO RELATED APPLICATIONS

The present application claims the benefit of Chinese Patent Application Nos. 202323319101.9 and 202323319103.8 filed on Dec. 6, 2023. All the above are hereby incorporated by reference in their entirety.

FIELD

The present disclosure discloses a network tester and, particularly, a multi-functional network tester, relating to the technical field of network maintenance.

BACKGROUND

With the popularity of fiber-optic communication, nowadays, for the engineers of network installation and maintenance, the measurement equipment and network testers are essential professional tools for the relevant data (such as optical power, voltage, current, resistance and other conventional electronic parameters). Optical power meter is an instrument used to measure the magnitude of optical power, both for the direct measurement of optical power and for the relative measurement of optical attenuation. In fiber-optic systems, the measurement of optical power is of fundamental importance. In fiber-optic measurements, the optical power meter is a common meter with heavy loads. Network tester is also commonly referred to as professional network tester or network detector, is a portable, visual intelligent testing equipment that allows for testing the operating conditions of the physical level, data link level, and network level as defined by the OSI model, and is mainly applicable to LAN fault detection, maintenance, and comprehensive cabling construction, with the functions of the network tester covering the physical level, the data link level, and the network level. With the popularization of the network and the increase in the variety of network transmission technologies, engineering network installation and maintenance personnel need to carry increasingly more equipment during work, thereby resulting in an increasingly heavy load.

SUMMARY

In view of the aforementioned deficiencies of the prior art in terms of the increasing number of network maintenance tools and the heavy load imposed on the engineers, provided in the present disclosure is a multi-functional network tester, by means of the design of circuit structures, it is achieved that the optical power measurement/multimeter function and network tester are combined in one unit to form a multi-functional network tester, which provides a more convenient and quicker practical tool for the engineers of network installation and maintenance, which enables the engineers of network installation and maintenance to carry less test instruments.

The technical solution adopted by the present disclosure to solve the technical problems is a multi-functional network tester, including a central control module, a power module, and one or more of a network cable length measurement module, a line-finding module, a switch detection module, and a network cable line-alignment module, wherein the multi-functional network tester further comprises an optical power module or a multimeter module, the network cable length measurement module, the line-finding module, the switch detection module and/or the network cable line-alignment module are connected to the central control module respectively, the optical power module or the multimeter module is connected to the central control module, and the power module is used for power supply.

The technical solutions adopted by the present disclosure to solve the technical problems further include the followings.

the central control module is connected with a battery voltage sampling module, the battery voltage sampling module includes a first resistor and a second resistor connected in series, a port of the first resistor is connected to a positive electrode of a lithium battery, an opposite port of the first resistor is connected to a port of the second resistor, an opposite port of the second resistor is grounded, and a common port between the first resistor and the second resistor is connected to an I/O port of the central control module with ADC function.

The central control module is further connected with an LCD display module.

The network cable length measurement module includes a PHY unit, a network transformer U3, and an RJ-45 interface J2, a data port of the PHY unit is connected to the central control module, the network transformer U3 is connected to a signal output port of the PHY unit, the RJ-45 interface J2 is connected to a signal input port of the network transformer U3, and a center tap of the network transformer U3 is connected to an I/O port of the central control module.

The optical power module includes an optical power converting module, a red light power control module, and a red light output module, the optical power converting module is connected to the central control module, the red light power control module is connected to the central control module, and the red light output module is connected to the red light power control module.

The optical power converting module includes a fiber-optic input interface J5, a channel selector U14, a primary amplifier U17, a secondary amplifier U18, and an analog-to-digital converter U22, a port of the fiber-optic input interface J5 is grounded, an opposite port of the fiber-optic input interface J5 is connected to an inverting input port of the primary amplifier U17 and is connected to a port X0, a port X1, a port X2, a port X3, a port Y0, a port Y1, a port Y2, and a port Y3 of the channel selector U14 via different resistors, the port X0 is short-circuited to the port Y0, the port X1 is short-circuited to the port Y1, the port X2 is short-circuited to the port Y2, the port X3 is short-circuited to the port Y3, a channel-selecting input port of the channel selector U14 is connected to a data port of the central control module, an I/O port Y of the channel selector U14 is connected to an output port of the primary amplifier U17, an I/O port X of the channel selector U14 is connected to an input port of the analog-to-digital converter U22, an output port of the analog-to-digital converter U22 is connected to a data port of the central control module, an output port of the primary amplifier U17 is connected to an input port of the secondary amplifier U18, and an output port of the secondary amplifier U18 is connected to a data port of the central control module.

The red light power control module includes a triode Q11 and an MOS transistor Q81, a base of the triode Q11 is connected to a data port of the central control module, an emitter of the triode Q11 is grounded, a collector of the triode Q11 is connected to a gate of the MOS transistor Q81, a source of the MOS transistor Q81 is connected to a +5V power supply, and a drain of the MOS transistor Q81 is connected to a red light output module.

The red light output module includes a triode Q61, an output interface J4, and a reference voltage triode U20, a drain of the MOS transistor Q81 is connected to a port of the output interface J4, an opposite port of the output interface J4 is connected to a collector of the triode Q61, an emitter of the triode Q61 is grounded, a base of the triode Q61 is connected to a drain of the MOS transistor Q81 via a resistor R114, the base of the triode Q61 is connected to a negative electrode of the reference voltage triode U20, and a positive electrode of the reference voltage triode U20 is grounded.

The network tester further includes an optical power supply control module, in which the optical power supply control module includes a linear voltage regulator U19, a power input port of the linear voltage regulator U19 is connected to a +5V power supply, a power output port of the linear voltage regulator U19 is connected to an output port of the analog-to-signal converter U22 via a pull-up resistor, and an enable port of the linear voltage regulator U19 is connected to a data port of the central control module.

The network cable line-alignment module includes a channel selector U8, a channel selector U5, an analog switch U9, and an RJ-45 interface J3, separate I/O ports of the channel selector U8 are connected to branches of the RJ-45 interface J3 respectively, a common I/O port of the channel selector U8 is grounded, a channel-selecting control port and an enable port of the channel selector U8 are connected to data ports of the central control module respectively, separate I/O ports of the channel selector U5 are connected to ports of the RJ-45 interface J3 respectively, a common I/O port of the channel selector U5 is connected to a data port of the central control module, a channel-selecting control port and an enable port of the channel selector U5 are connected to data ports of the central control module, a first I/O port A of the analog switch U9 is connected to the common I/O port of the channel selector U5, a first I/O port B of the analog switch U9 is grounded, a second I/O port A and a second I/O port B of the analog switch U9 are connected to a ground port of the RJ-45 interface J3 respectively, a control port A of the analog switch U9 is connected to a data port of the central control module being the same data port also connected to an enable port of the channel selector U5, and a control port B of the analog switch U9 is connected to a data port of the central control module being the same data port also connected to an enable port of the channel selector U8;

the network cable line-alignment module further includes a channel selector U4 and a single Schmitt-trigger inverter U6 when the multi-functional network tester comprises the optical power module, in which separate I/O ports of the channel selector U4 are connected to ports of the RJ-45 interface respectively, a common I/O port of the channel selector U4 is connected to a port A of the single Schmitt-trigger inverter U6, a port Y of the single Schmitt-trigger inverter U6 is connected to a data port of the central control module, and the port A of the single Schmitt-trigger inverter U6 is connected to the port Y thereof via a resistor R52.

When the multi-functional network tester includes the optical power module, the line-finding module adopts a line driver U2, a port Y3 and a port Y4 of the line driver U2 are connected to an interface J8, the port Y4 of the line driver U2 is connected to an RJ-45 interface J6, a port A1 of the line driver U2 is connected to a +5V power supply, a port A2 of the line driver U2 is grounded, a port A3 of the line driver U2 is connected to a +5V power supply via a resistor R77 and to a collector of a triode Q51, an emitter of the triode Q51 is grounded, a port A4 of the line driver U2 is connected to a base of the triode Q51, a +5V power supply via a resistor R82, and a collector of a triode Q41, an emitter of the triode Q41 is grounded, and a base of the triode Q41 is connected to a common I/O port of the central control module, a port OE1 and a port OE2 of the line driver U2 are connected to a +5V power supply via a resistor R61 respectively, a port OE3 and a port OE4 of the line driver U2 are connected to a +5V power supply via a resistor R76 respectively, and the port OE3 and the port OE4 of the line driver U2 are connected to a collector of a triode Q31 respectively, an emitter of the triode Q31 is grounded, and a base of the triode Q31 is connected to a common I/O port of the central control module.

When the multi-functional network tester includes the multimeter module, the multimeter module includes a triode Q32, a triode Q42, a triode Q52, a triode Q15, a triode Q16, and a triode Q17, a base of the triode Q32 is connected to a data port of the central control module, an emitter of the triode Q32 is grounded, a collector of the triode Q32 is connected to a +8V power supply via a resistor R62, a base of the triode Q42 is connected to the collector of the triode Q32, a collector of the triode Q42 is connected to +8V power supply, an emitter of the triode Q42 is connected to an emitter of the triode Q52, a collector of the triode Q52 is grounded, a base of the triode Q52 is connected to the collector of the triode Q32, the emitter of the triode Q42 is connected to third, sixth, seventh, eighth ports of an RJ-45 interface, a base of the triode Q17 is connected to a data port of the central control module, an emitter of the triode Q17 is grounded, a collector of the triode Q17 is connected to a +8V power supply via a resistor R97, a base of the triode Q15 is connected to the collector of the triode Q17, a collector of the triode Q15 is connected to a +8V power supply, an emitter of the triode Q15 is connected to an emitter of the triode Q16, a collector of the triode Q16 is grounded, a base of the triode Q16 is connected to the collector of the triode Q17, and the emitter of the triode Q15 and the emitter of the triode Q16 are connected to first, second, fourth, fifth, and ground ports of the RJ-45 interface.

A first RC filter module is series-connected between the base of the triode Q32 and a data port of the central control module, the first RC filter module includes a resistor R32 and a capacitor C37 connected in parallel, a second RC filter module is series-connected between the base of the triode Q17 and a data port of the central control module, and the second RC filter module comprises a resistor R28 and a capacitor C36 connected in parallel.

The switch detection module includes a rectifier bridge D1, a rectifier bridge D2, an interface controller U15, and four branches of switch voltage detection modules, a first input port of the rectifier bridge D1 is connected to first and second ports of an RJ-45 interface, a second input port of the rectifier bridge D1 is connected to third and sixth ports of the RJ-45 interface, a first input port of the rectifier bridge D2 is connected to fourth and fifth ports of the RJ-45 interface, a second input port of the rectifier bridge D2 is connected to seventh and eighth ports of the RJ-45 interface, output ports of both the rectifier bridge D1 and rectifier bridge D2 are connected to a signal input port of the interface controller U15, a signal output port of the interface controller U15 is connected to a data port of the central control module, four branches of switch voltage detection modules adopt voltage-dividing resistors connected in series respectively, and a common port of the voltage-dividing resistors is connected to a data port with ADC function.

The multimeter module adopts a multimeter specialized chip U17', serial interfaces of the multimeter specialized chip U17' is connected to serial interfaces of the central control module, a data port of the multimeter specialized chip U17' is connected with a gear selection module, the gear selection module includes a relay REAL1, a triode Q2, a triode Q62, a triode Q7, and a triode Q82, a base of the triode Q82 is connected to a first data port of the multimeter specialized chip U17', an emitter of the triode Q82 is grounded, a collector of the triode Q82 is connected to a first port of a coil of the relay REAL1, a base of the triode Q62 is connected to a second data port of the multimeter specialized chip U17', an emitter of the triode Q62 is connected to a +3.3V power supply, a collector of the triode Q62 is connected to a second port of the coil of the relay REAL1, a base of the triode Q2 is connected to a third data port of the multimeter specialized chip U17', an emitter of the triode Q2 is connected to a +3.3V power supply, a collector of the triode Q2 is connected to the first end of the coil of the relay REAL1, a base of the triode Q7 is connected to a fourth data port of the multimeter specialized chip U17', an emitter of the triode Q7 is grounded, and a collector of the triode Q7 is connected to a second port of the coil of the relay REAL1.

The central control module is further connected with a key module.

The power module includes a USB interface, a lithium battery charging management chip U7, a lithium battery, and a DC-DC boost chip U21, the USB interface is connected to the lithium battery charging management chip U7, the lithium battery is charged via the USB interface, the lithium battery is connected to the lithium battery charging management chip U7, the DC-DC boost chip U21 is connected to the lithium battery, the power module further comprises a power management chip U16 and a voltage regulator chip U13, the power management chip U16 regulates a voltage of the lithium battery to +3.3V for power supply, and the voltage regulator chip U13 regulates the voltage output by the power management chip U16 to +1.5V for power supply.

The beneficial effects of the present disclosure are as follows. The compatibility of the optical power measurement/multimeter function with the network tester is achieved in the present disclosure. The multi-functional network tester compatible with the optical power module is able to process optical signals, and read the processed data to measure the optical power. The multi-functional network tester compatible with the multimeter module achieves instruction recognition between multimeter chips, control and data reading by means of the MCU serial communication port. The data tested by the multimeter chips is communicated to the MCU through the serial port for decoding, and is presented correspondingly on the display. Evidently, it is achieved that the optical power measurement/multimeter function and multi-functional network tester are combined in one unit in the present disclosure, which provides a more convenient and quicker practical tool for the engineers of network installation and maintenance, which enables the engineers of network installation and maintenance to carry less test instruments.

The present disclosure is further described below in conjunction with the attached drawings.

BRIEF DESCRIPTION OF THE DRAWINGS

Inset 1-A of FIG. 1 is a circuit block diagram of the multi-functional network tester with the optical power module in the present disclosure.

Inset 1-B of FIG. 1 is a circuit block diagram of the multi-functional network tester with the multimeter module in the present disclosure.

Figure 11:
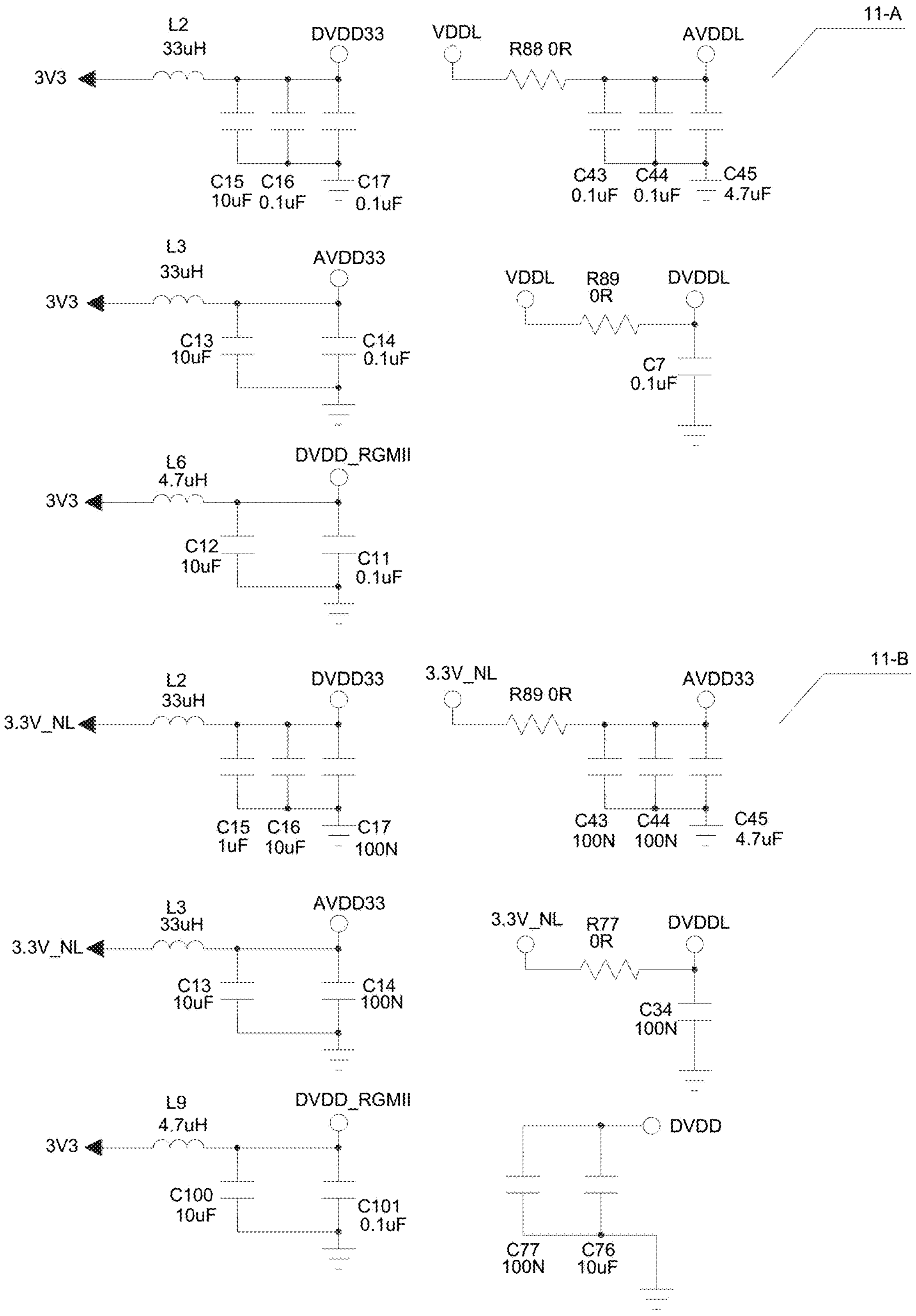
Figure 12:
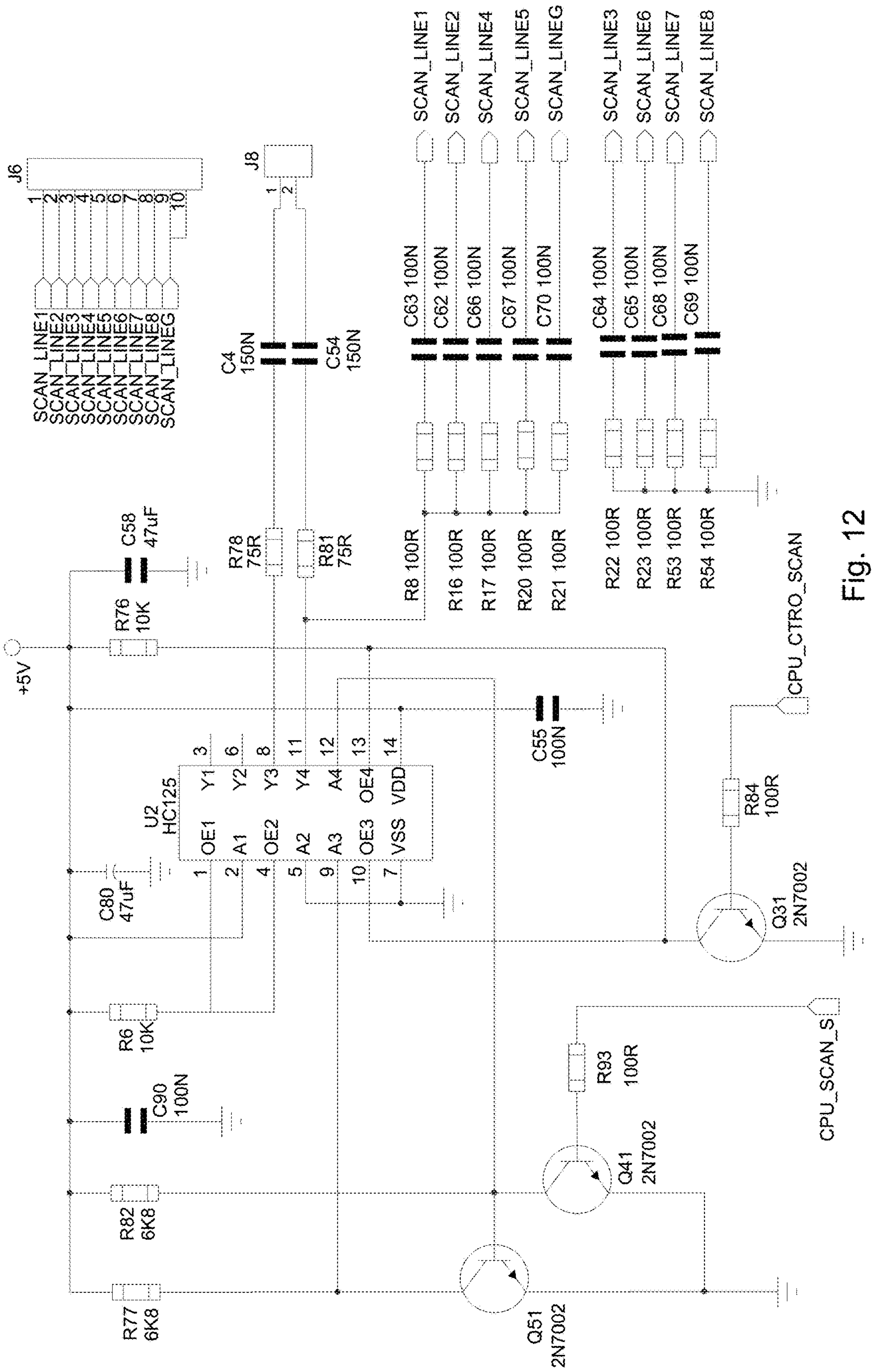
Figure 13:
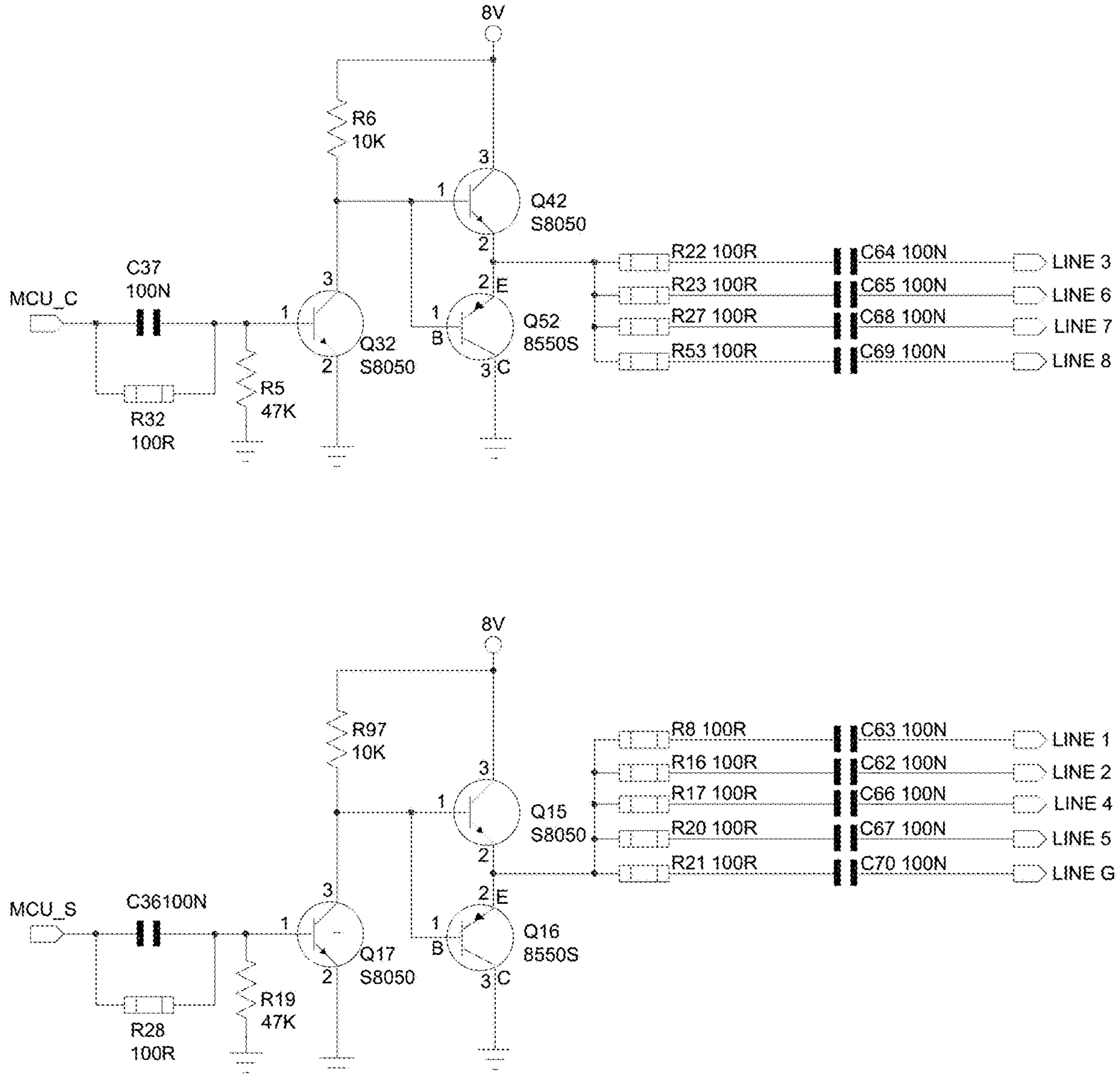
Figure 14:
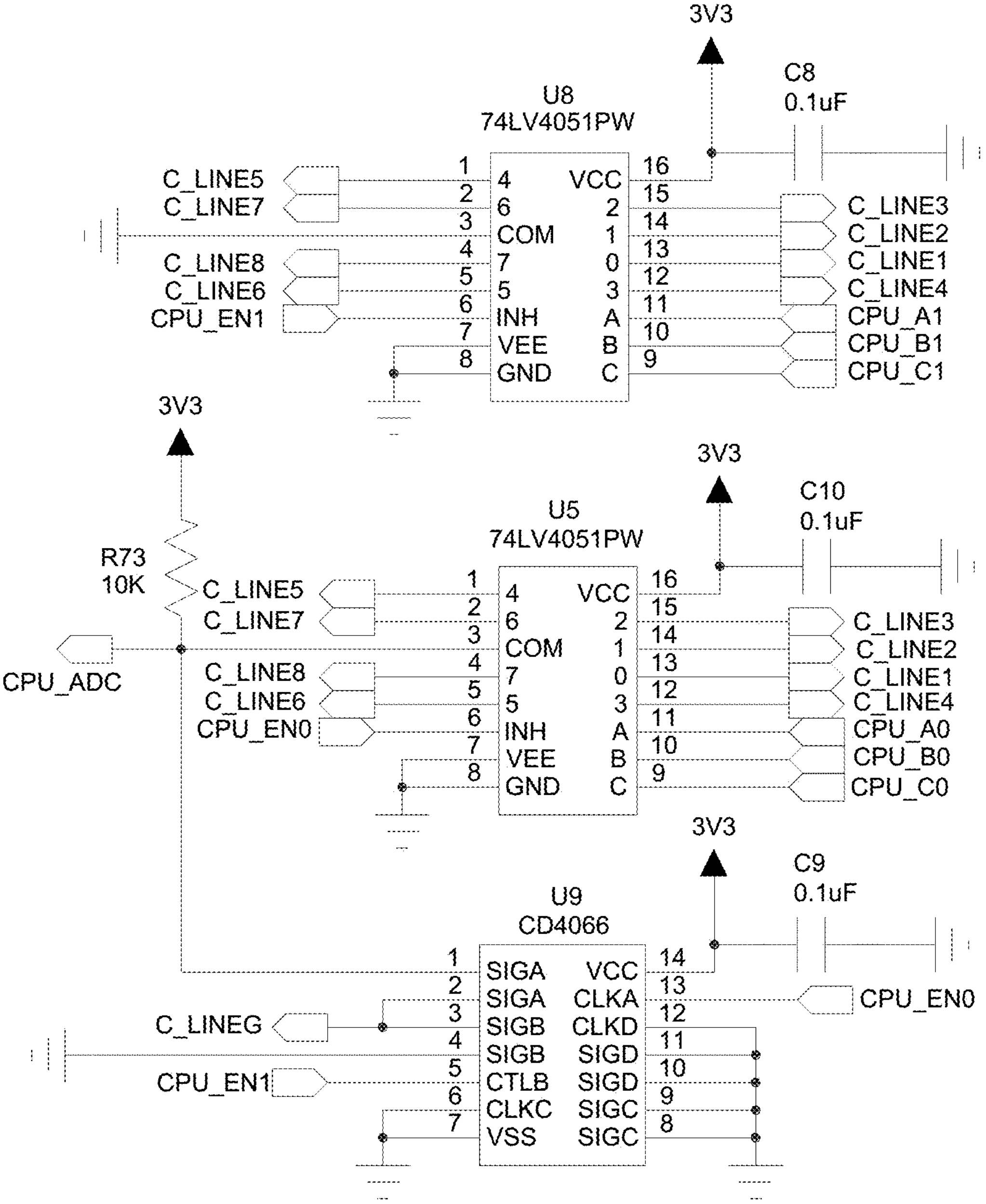
Figure 15:
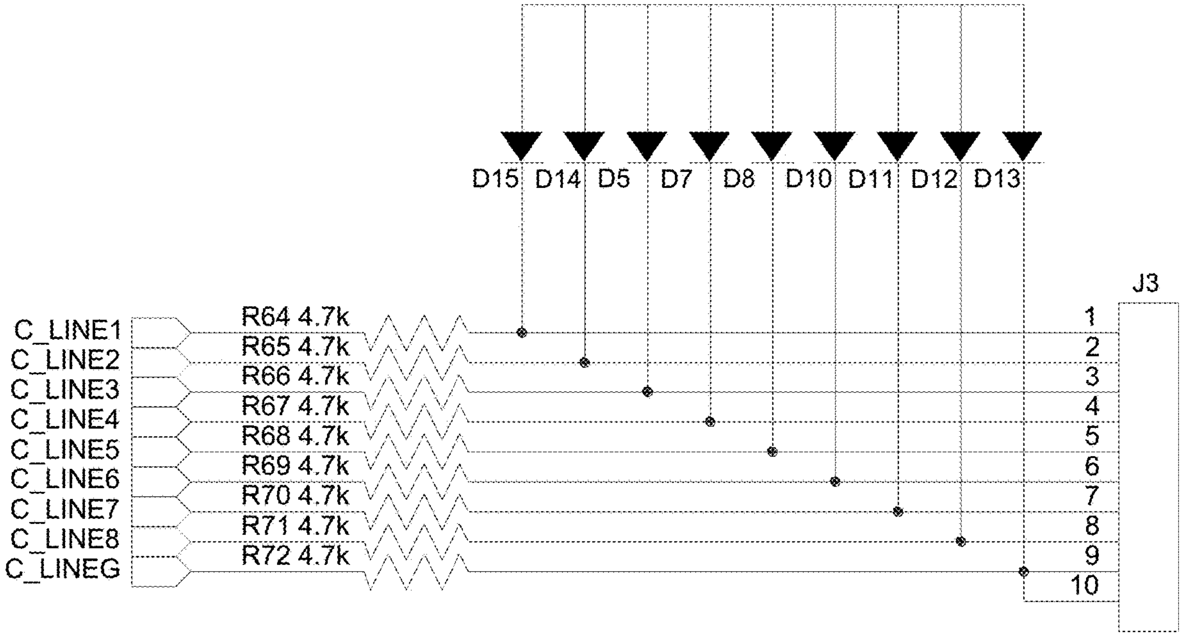
Figure 16:
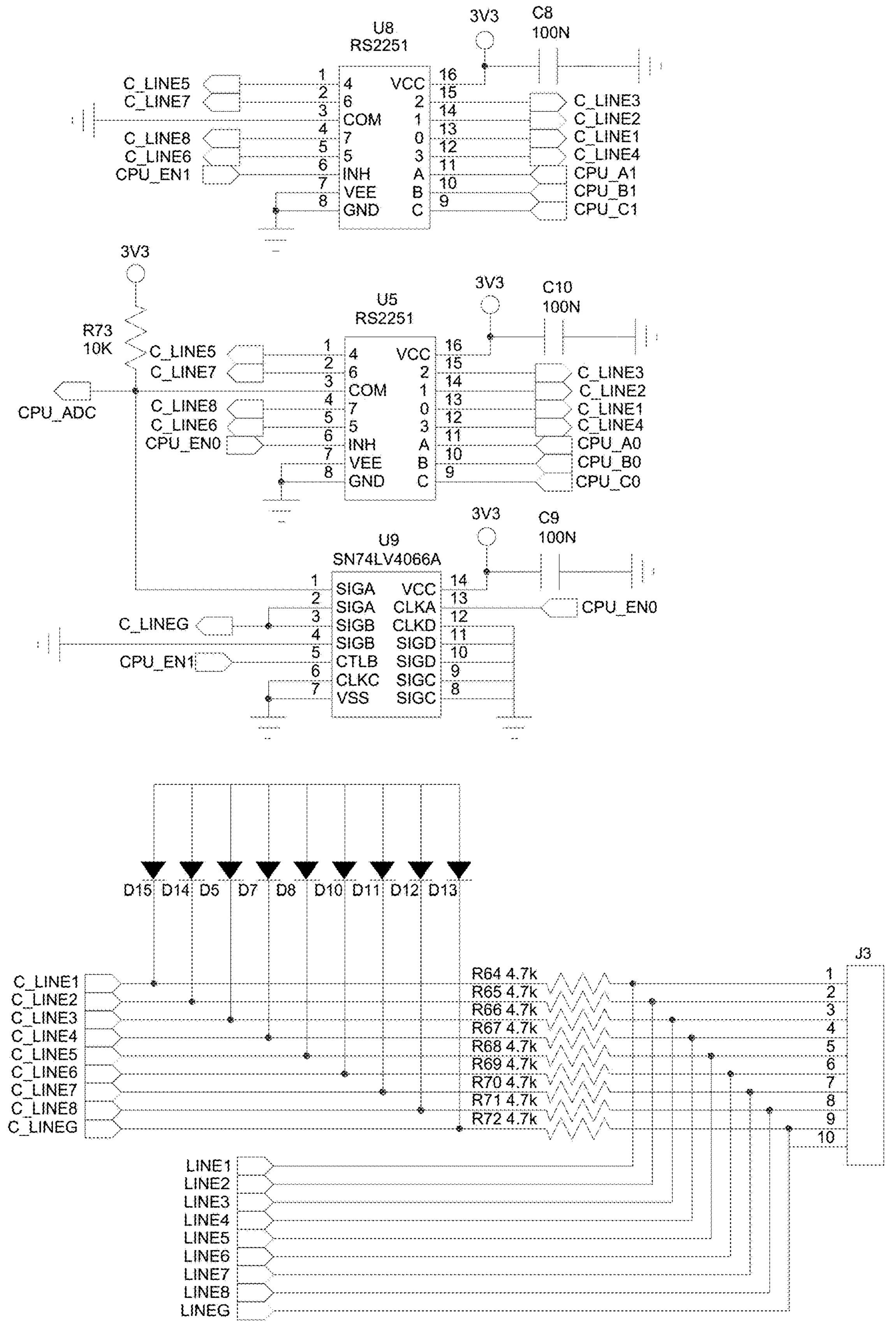
Figure 17:
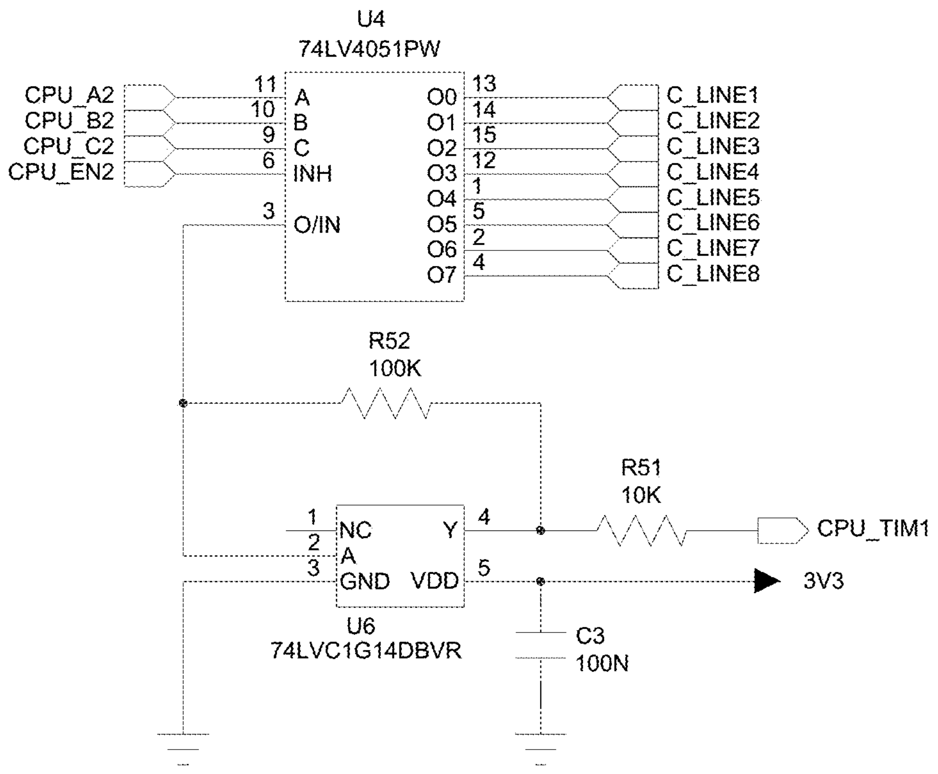
Figure 18:
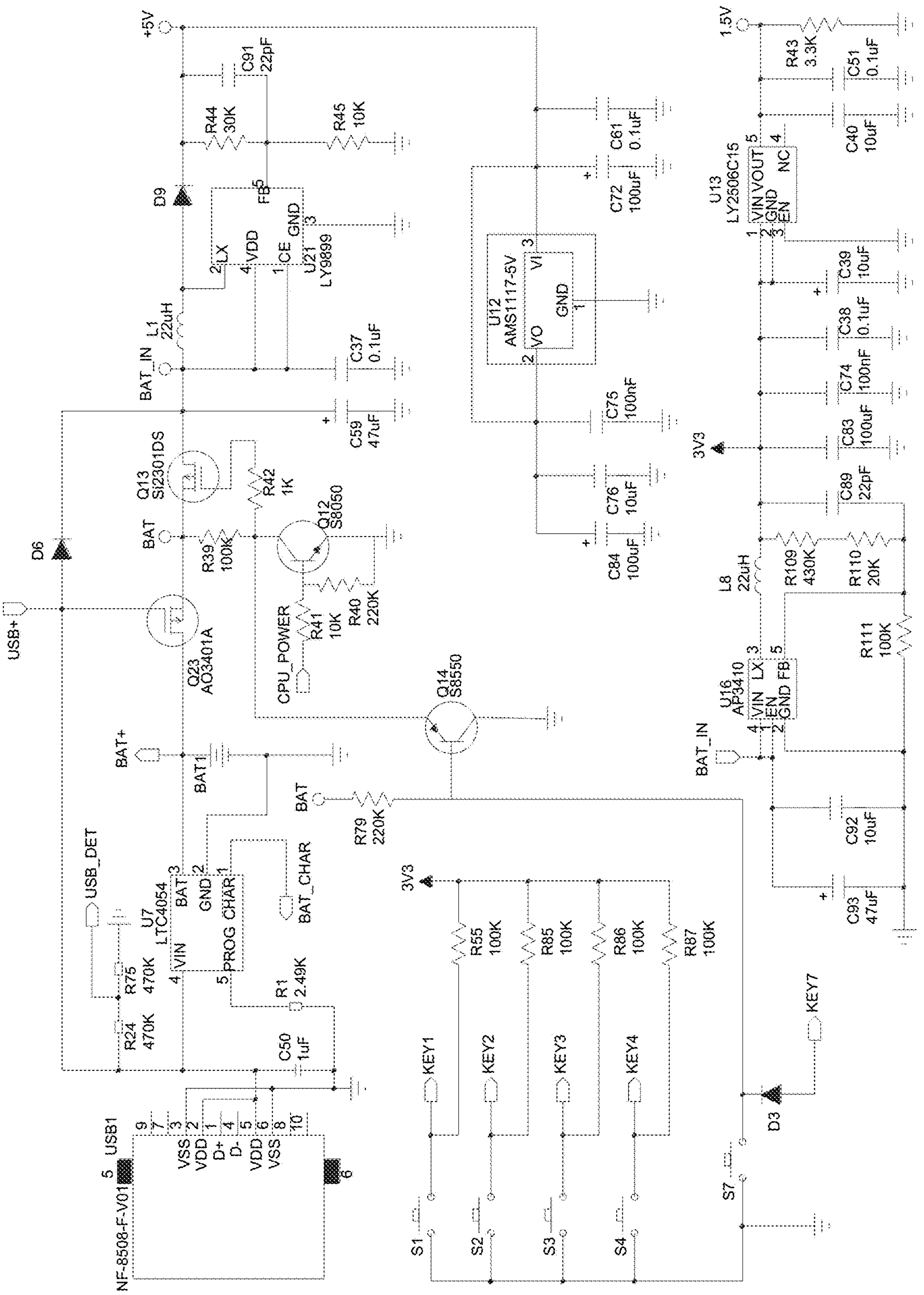
Figure 19:
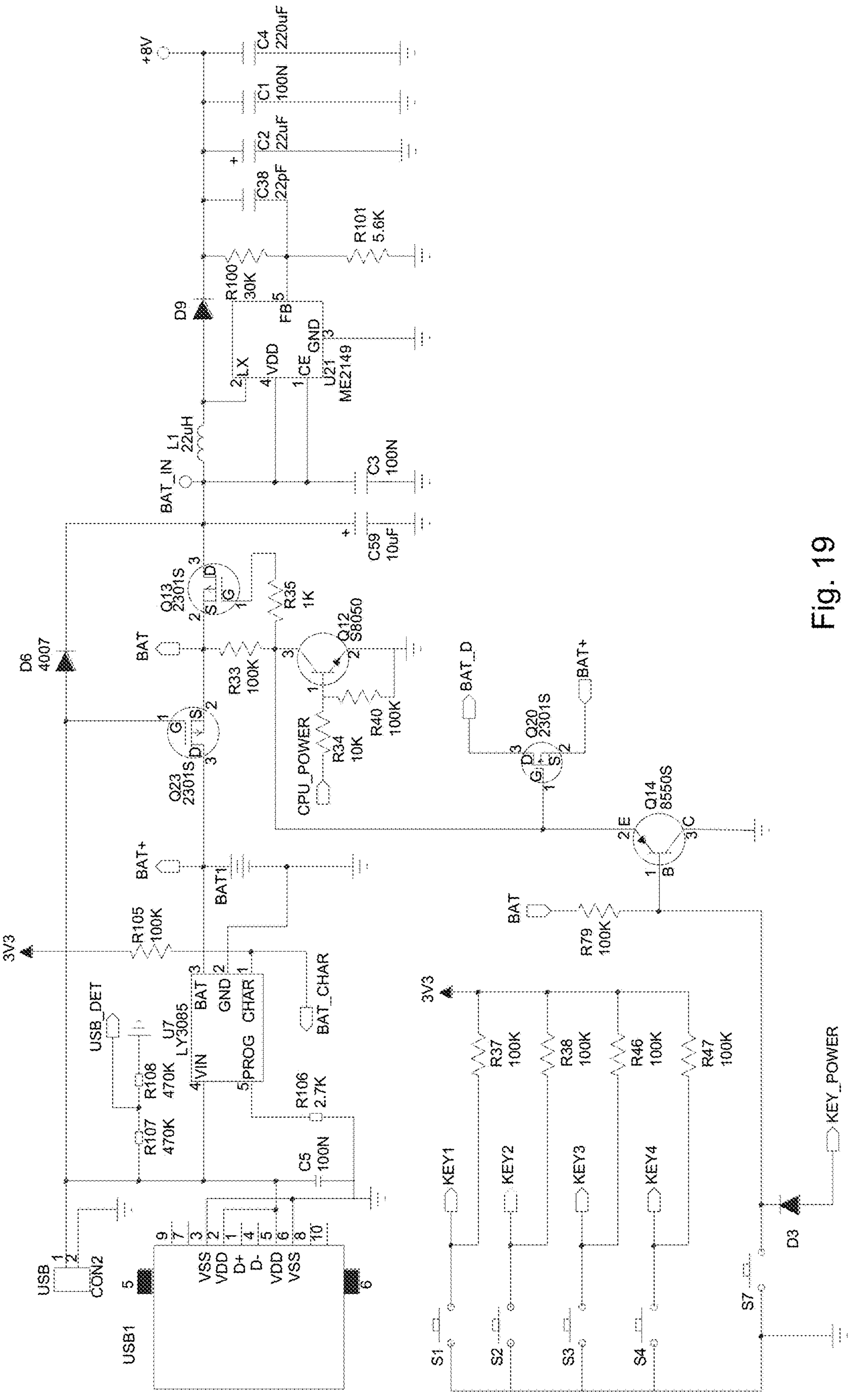
Figure 20:
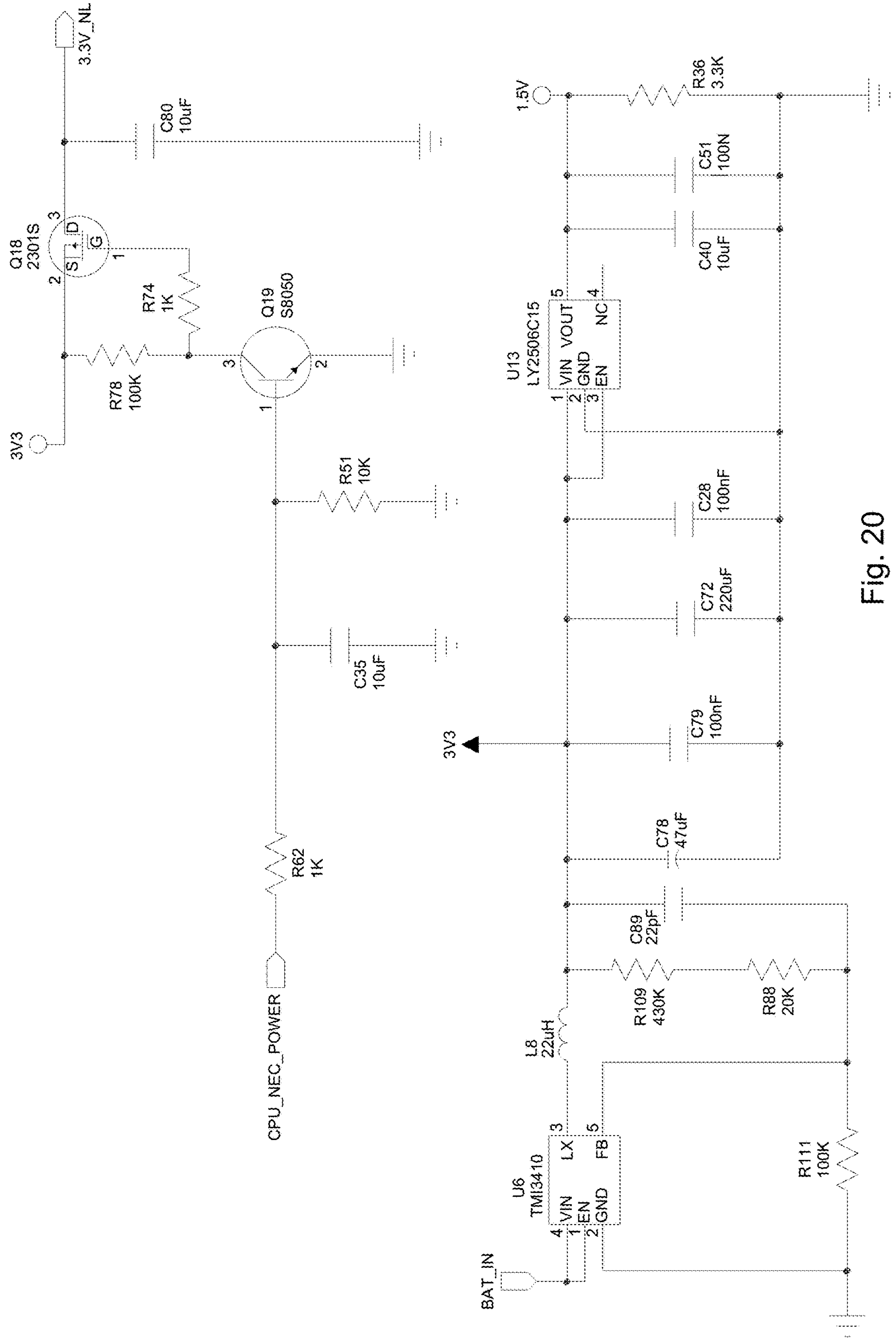
Figure 21:
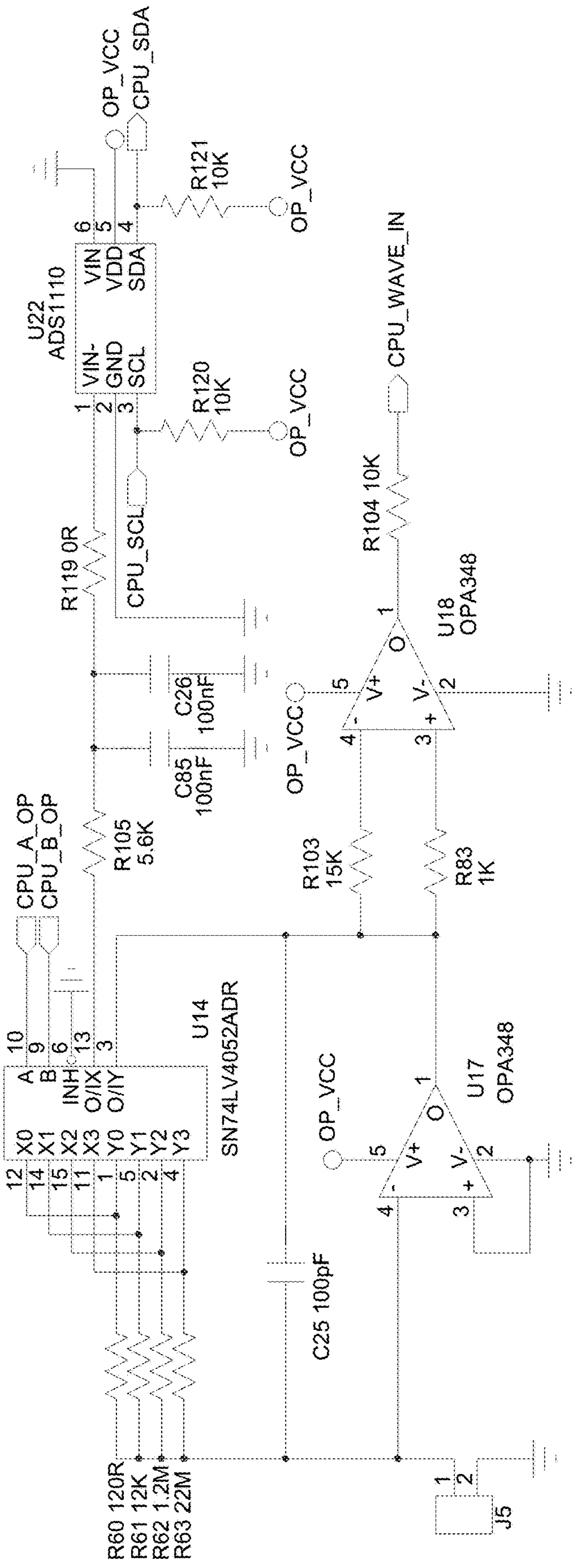
Figure 22:
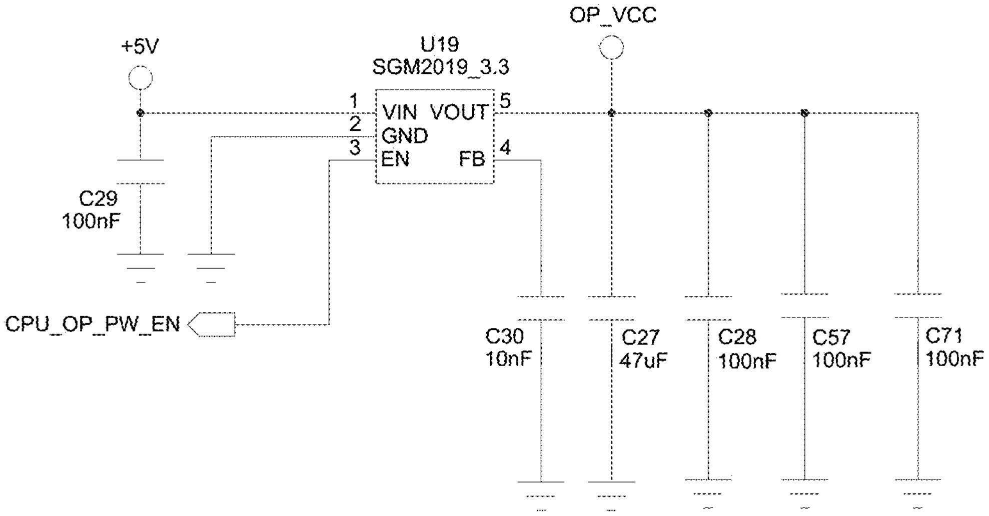
Figure 23:
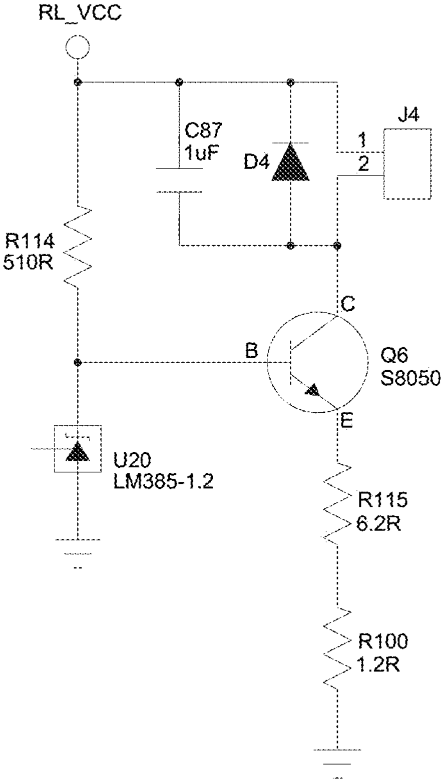
Figure 24:
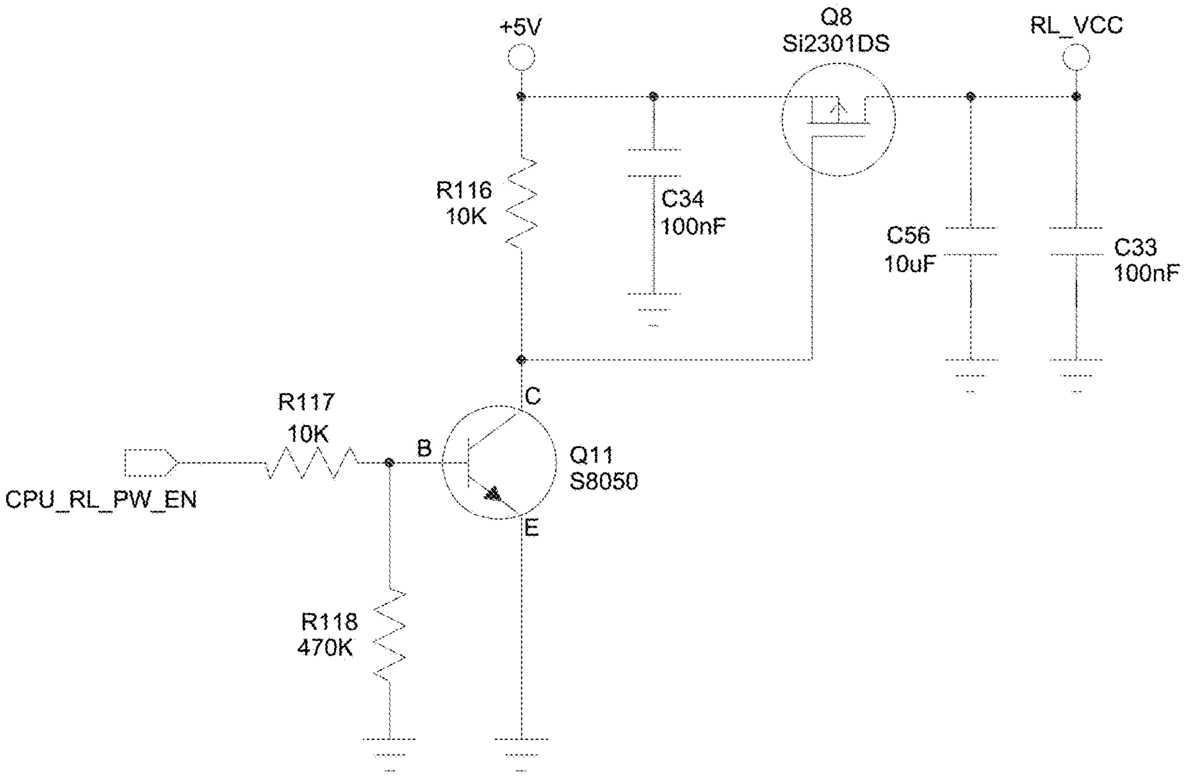
Figure 25:
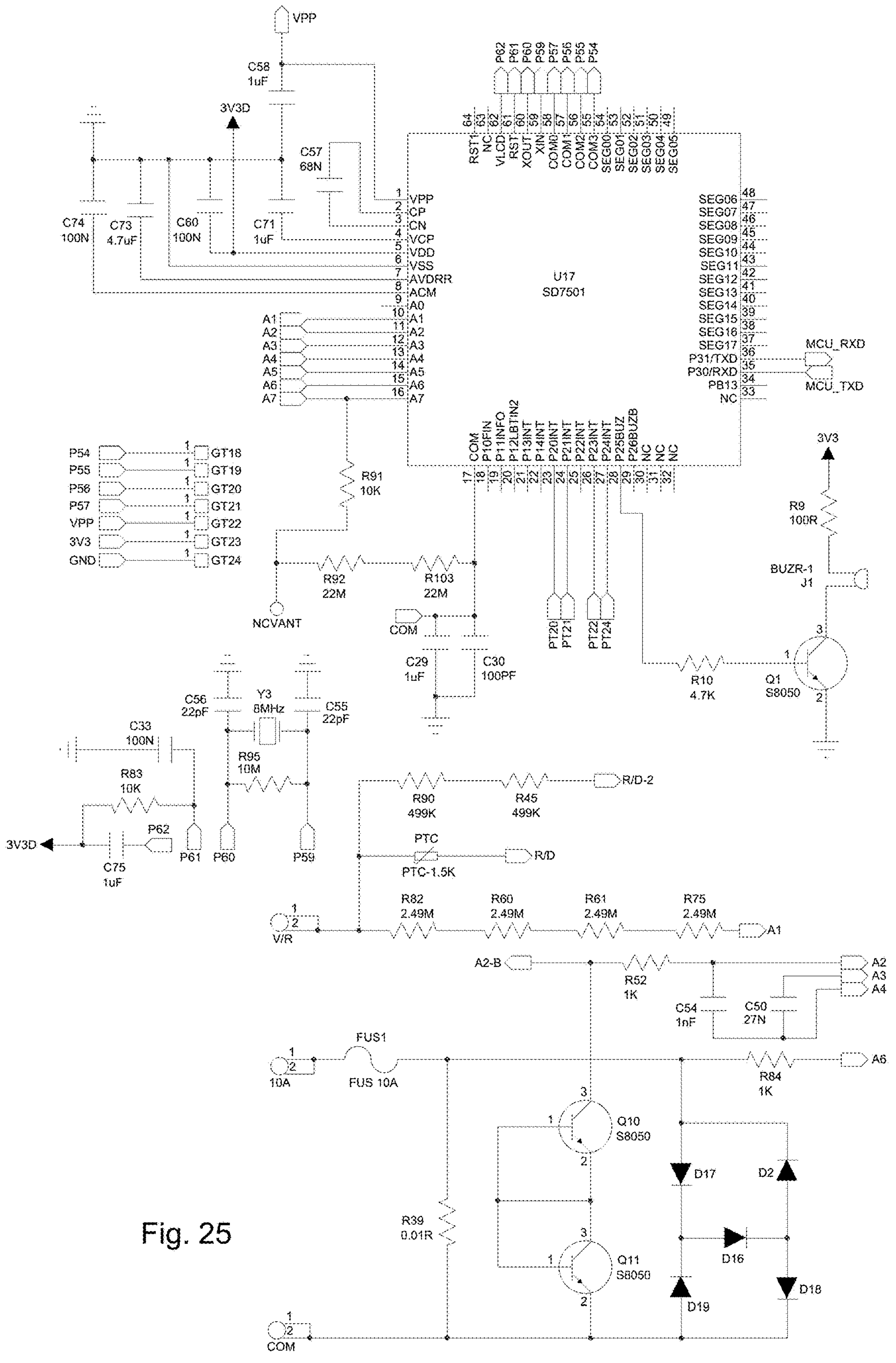
Figure 26:
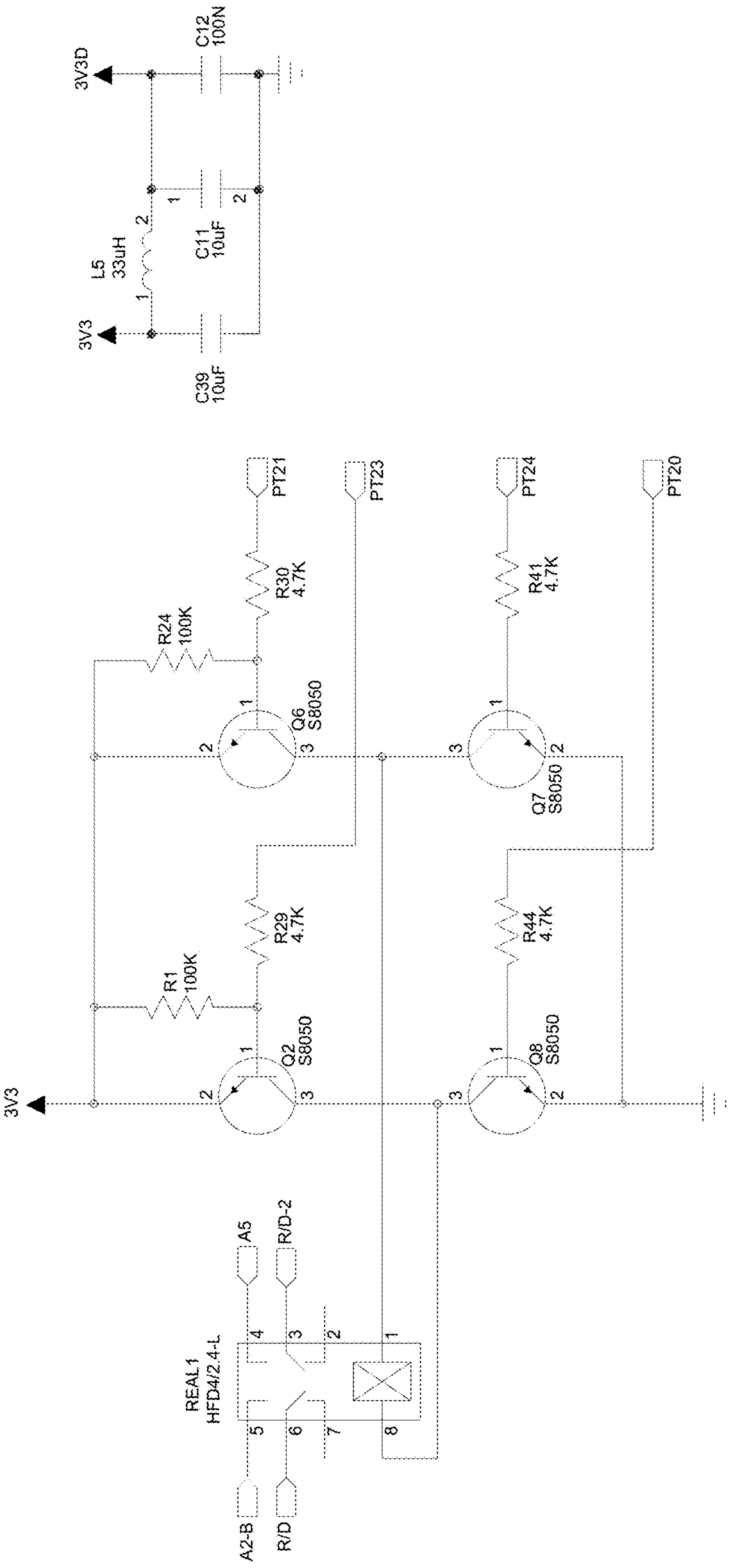

Inset 11-A of FIG. 11 is a circuit diagram of a power filter module in the present disclosure;

Inset 11-B of FIG. 11 is a circuit diagram of another power filter module in the present disclosure;

FIG. 12 is a circuit diagram of a line-finding module in the present disclosure;

FIG. 13 is a circuit diagram of another line-finding module in the present disclosure;

FIG. 14 is a circuit diagram of a network cable line-alignment module in the present disclosure;

FIG. 15 is a circuit diagram of the network cable line-alignment interface including in the network cable line-alignment module in the present disclosure;

FIG. 16 is a circuit diagram of another network cable line-alignment module in the present disclosure;

FIG. 17 is a circuit diagram of the channel selector in the present disclosure;

FIG. 18 is a circuit diagram of a power supply module in the present disclosure;

FIG. 19 is a circuit diagram of another power supply module in the present disclosure;

FIG. 20 is a circuit diagram of the secondary module of the power supply module in the present disclosure;

FIG. 21 is a circuit diagram of the optical power converting module in the present disclosure;

FIG. 22 is a circuit diagram of the optical power supply control module in the present disclosure;

FIG. 23 is a circuit diagram of the red light output module in the present disclosure;

FIG. 24 is a circuit diagram of the red light power supply control module in the present disclosure;

FIG. 25 is a circuit diagram of the multimeter module in the present disclosure;

FIG. 26 is a circuit diagram of the gear selection module in the present disclosure.

DETAILED DESCRIPTION OF THE EMBODIMENTS

The present embodiment is the preferred embodiment of the present disclosure, and any other principle and basic structure that is the same or similar to the present embodiment is within the scope of protection of the present disclosure.

Figure 1:
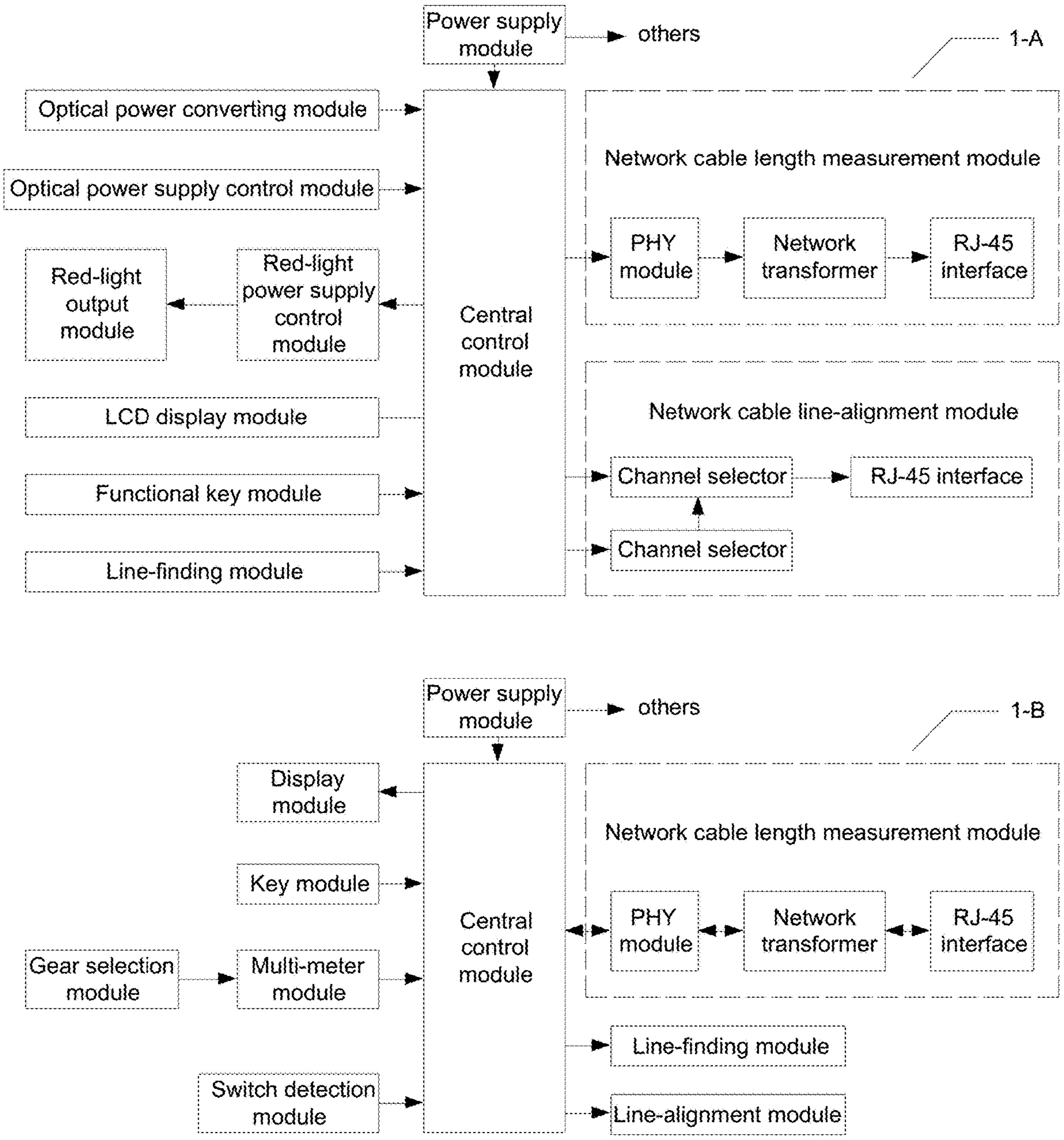
Figure 2:
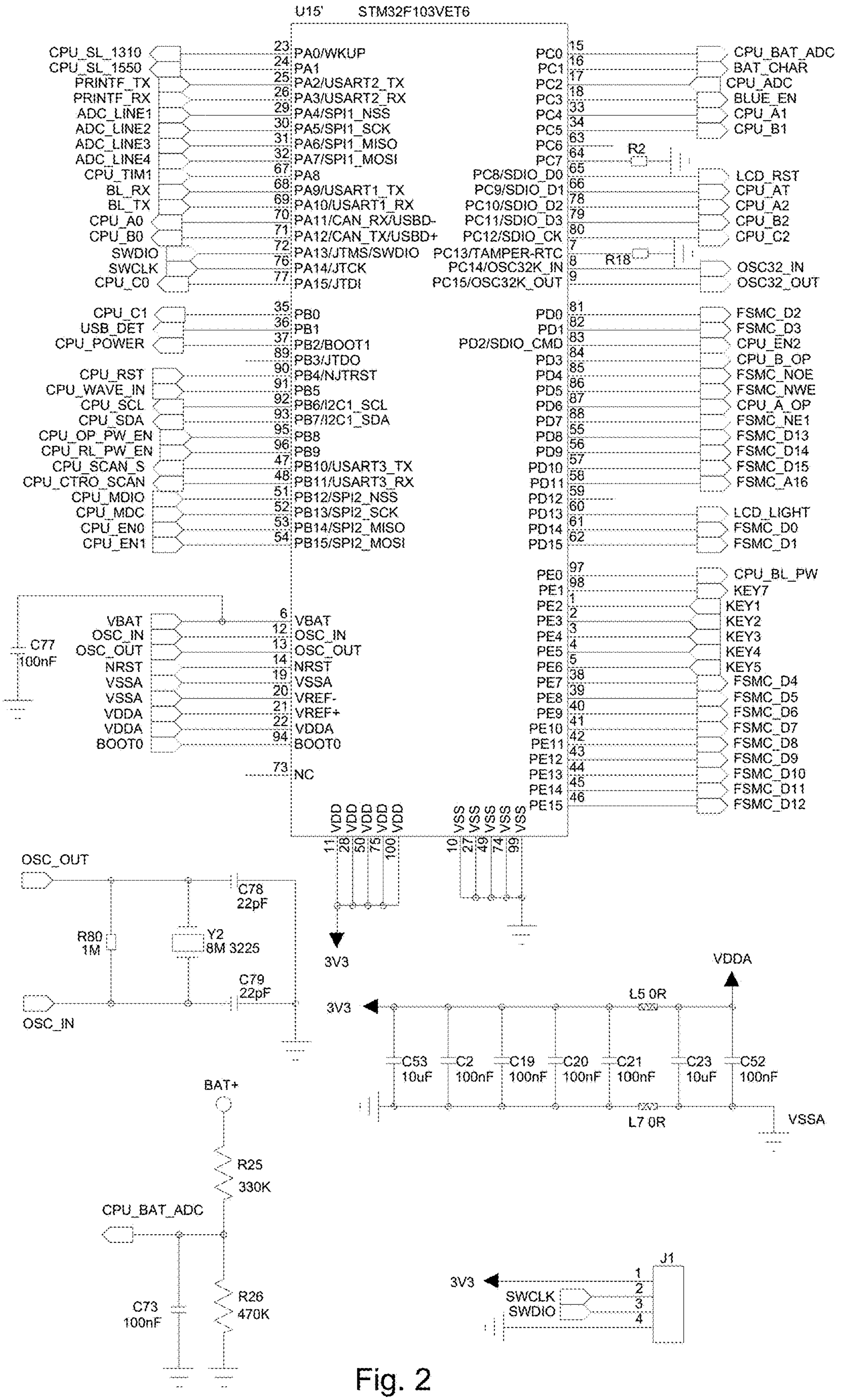
FIG. 2 is a circuit diagram of a central control module in the present disclosure.
Figure 3:
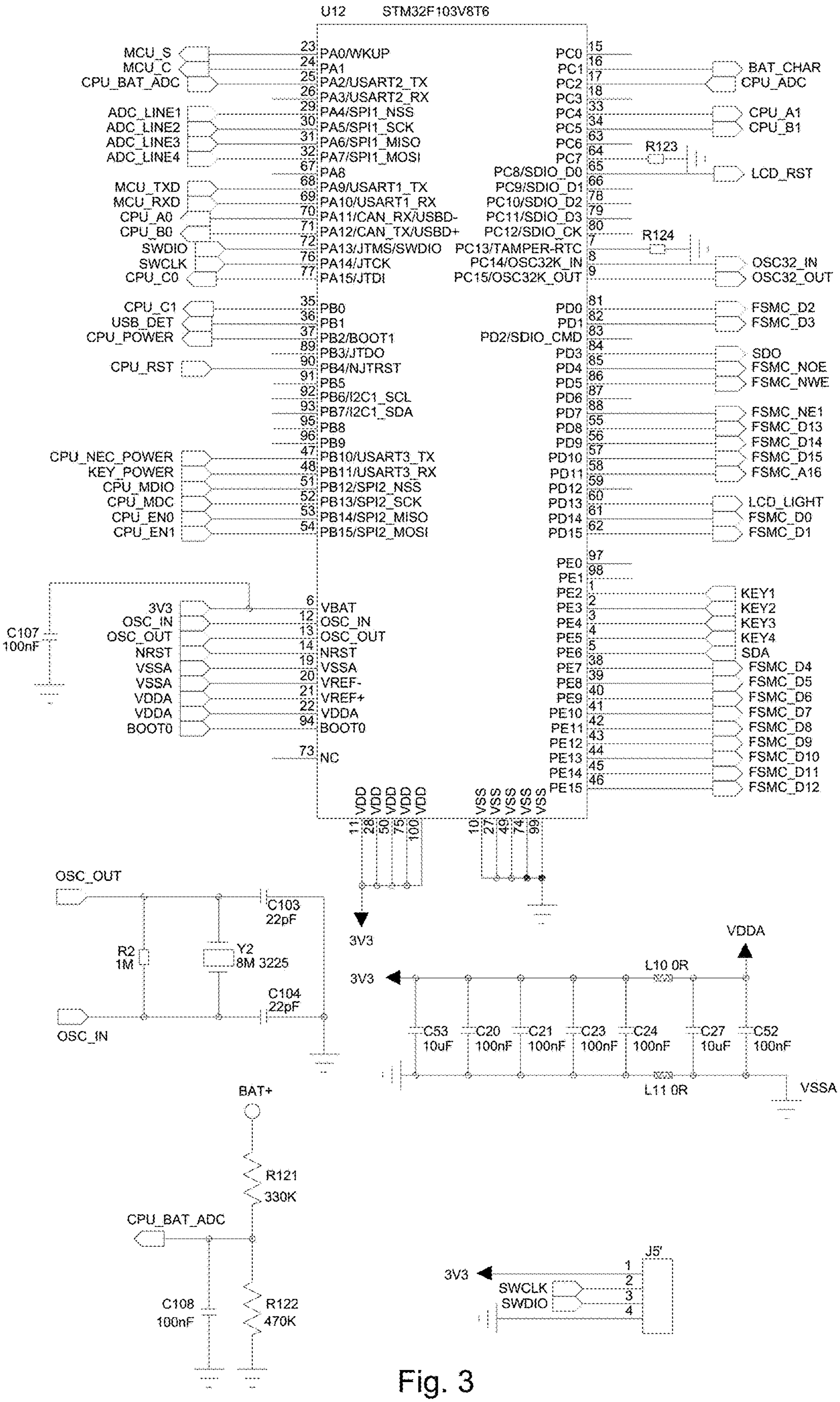
FIG. 3 is a circuit diagram of another central control module in the present disclosure.

Referring to FIGS. 1-26, the multi-functional network tester of the present disclosure mainly includes a central control module, a power module, and one or more of a network cable length measurement module, a line-finding module, a switch detection module, and a network cable line-alignment module, in which the multi-functional network tester further includes an optical power module or a multimeter module, the network cable length measurement module, the line-finding module, the switch detection module and/or the network cable line-alignment module are connected to the central control module respectively, the optical power module or the multimeter module is connected to the central control module, and the power module is used for power supply. Please refer to inset 1-A of FIG. 1 for a circuit block diagram of the multi-functional network tester compatible with the optical power module and 1-B of FIG. 1 for a circuit block diagram of the multi-functional network tester compatible with the multimeter module.

In an optional implementation, the central control module adopts a microcontroller. In specific implementations, other chips with the same function in the prior art may also be used instead. The microcontroller is connected with a battery voltage sampling module, the battery voltage sampling module comprises a first resistor and a second resistor connected in series, a port of the first resistor is connected to a positive electrode of a lithium battery, an opposite port of the first resistor is connected to a port of the second resistor, an opposite port of the second resistor is grounded, and a common port between the first resistor and the second resistor is connected to an I/O port of the central control module with ADC function. If the used microcontroller does not provide an ADC function, the common port of the first resistor and the second resistor is connected to an AD converter. The AD converter is then connected to the central control module, and the battery voltage sampling module is able to detect the lithium battery voltage, so as to determine the amount of remaining power. Please refer to FIG. 2 for the circuit diagram of the central control module in the multi-functional network tester compatible with the optical power module, the central control module in FIG. 2 adopts a microcontroller U15' of model STM32F103VET6, and the first resistor and the second resistor correspond to R25 and R26 respectively. Please refer to FIG. 3 for the circuit diagram of the central control module in the multi-functional network tester compatible with the multimeter module, the central control module in FIG. 3 adopts a microcontroller U12 of model STM32F103V8T6, and the first resistor and the second resistor correspond to R121 and R122 respectively.

Figure 4:
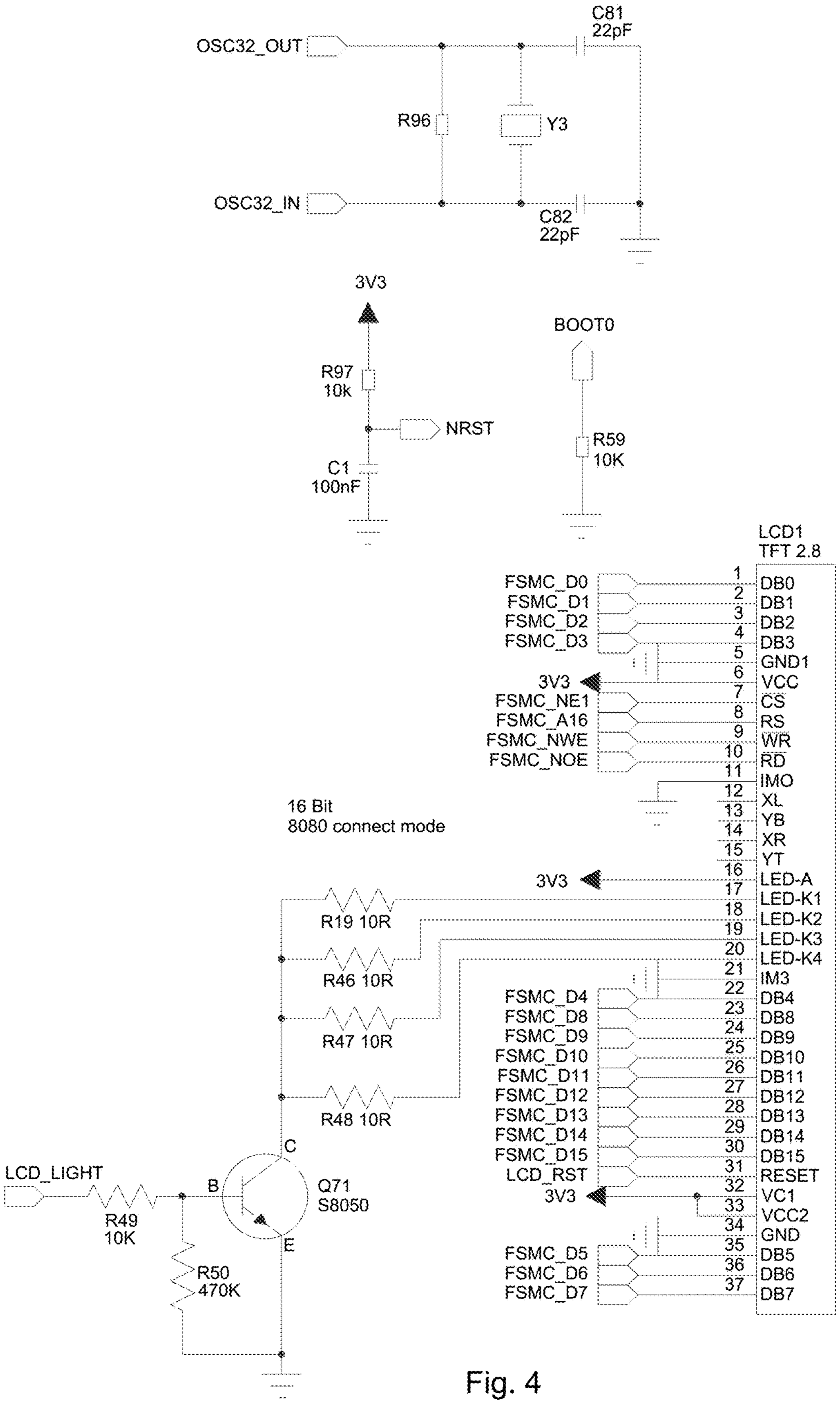
FIG. 4 is a circuit diagram of an LCD display module in the present disclosure.
Figure 5:
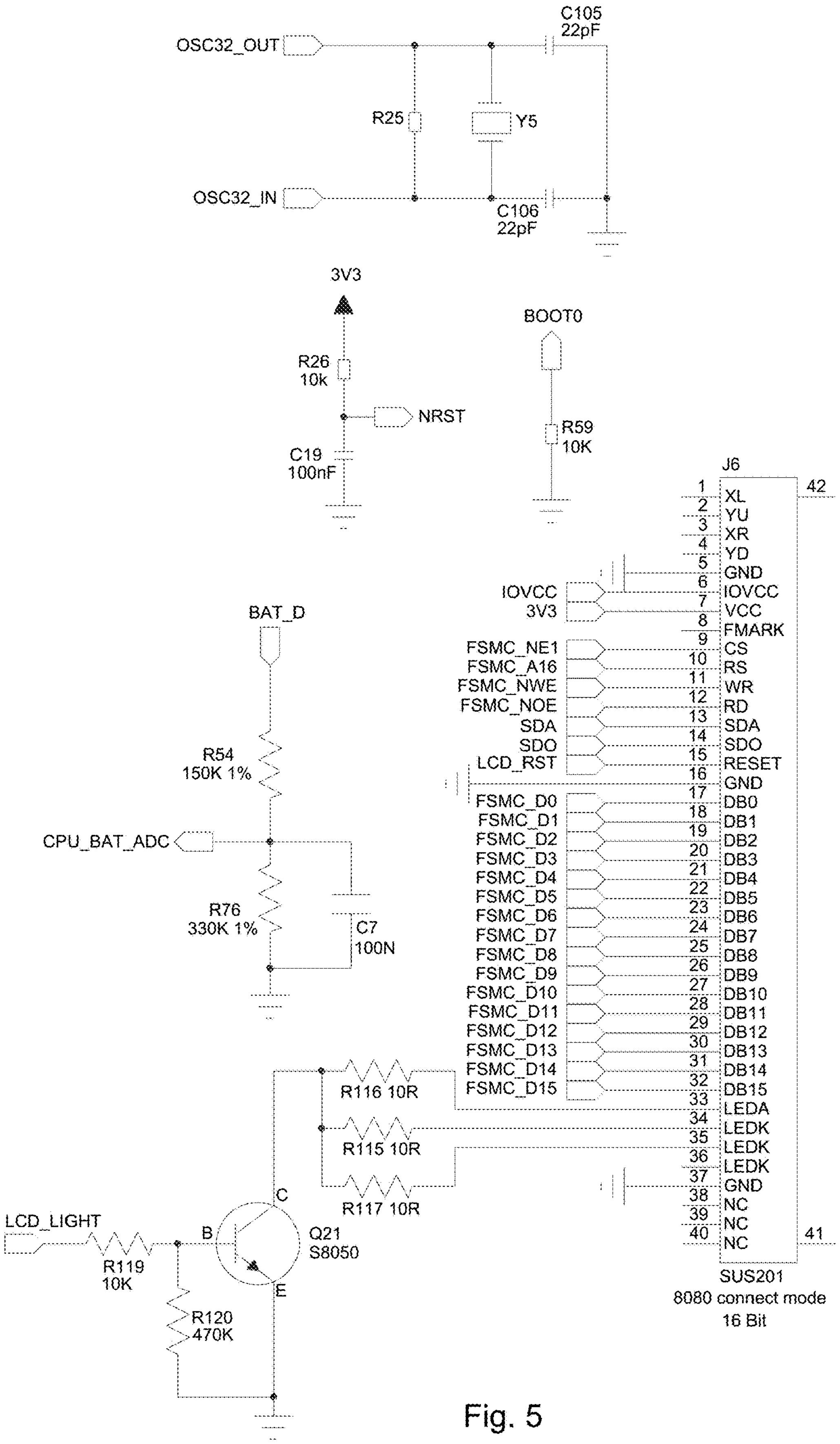
FIG. 5 is a circuit diagram of another LCD display module in the present disclosure.

In an optional implementation, the central control module is further connected with an LCD display module. Referring to FIG. 4, for the multi-functional network tester compatible with the optical power module, the LCD display module connected to the central control module adopts a TFT2.8 display screen. Referring to FIG. 5, for the multi-functional network tester compatible with the multimeter module, the LCD display module connected to the central control module adopts an LCD screen interface J6, and a corresponding LCD display screen may be connected to the LCD screen interface J6. Evidently, the LCD display module connected to the central control module enables the multi-functional network tester of the present disclosure to have a display function. Other display means may also be used instead to achieve the display function in specific implementations.

In an optional implementation, the network cable length measurement module includes a PHY unit, a network transformer U3, and an RJ-45 interface J2, in which the PHY unit adopts a PHY chip U10 of model YT8521S and may adopt a PHY chip of other models in specific implementations. A data port of the PHY unit is connected to the central control module, in which the network transformer U3 adopts a network transformer of model H82409S and may adopt other a network transformer of other models in specific implementations. The network transformer U3 is connected to a signal output port of the PHY unit, the RJ-45 interface J2 is connected to a signal input port of the network transformer U3, and a center tap of the network transformer U3 is connected to an I/O port of the central control module. Since the PHY unit requires high power stability, a power filter module is connected to a power supply port of the PHY unit. For the multi-functional network tester compatible with the optical power module, please refer to inset 11-A of FIG. 11 for a circuit diagram of the power filter module connected to the power supply port of the PHY unit. For the multi-functional network tester compatible with the multimeter module, please refer to inset 11-B of FIG. 11 for a circuit diagram of the power filter module connected to the power supply port of the PHY unit.

In an optional implementation, the switch detection module includes a rectifier bridge D1, a rectifier bridge D2, an interface controller U1, and four branches of switch voltage detection modules, a first input port of the rectifier bridge D1 is connected to first and second ports of an RJ-45 interface, a second input port of the rectifier bridge D1 is connected to third and sixth ports of the RJ-45 interface, a first input port of the rectifier bridge D2 is connected to fourth and fifth ports of the RJ-45 interface, a second input port of the rectifier bridge D2 is connected to seventh and eighth ports of the RJ-45 interface, output ports of both the rectifier bridge D1 and rectifier bridge D2 are connected to a signal input port of the interface controller U1, and a signal output port of the interface controller U1 is connected to a data port of the central control module. In the present embodiment, the circuit structures in the four branches of switch voltage detection modules are the same, which are all achieved by voltage-dividing resistors connected in series. For the multi-functional network tester with the optical power module, please refer to FIG. 7 for the circuit diagram of the switch detection module. For the multi-functional network tester with the multimeter module, please refer to FIG. 8 for the circuit diagram of the switch detection module.

Figure 7:
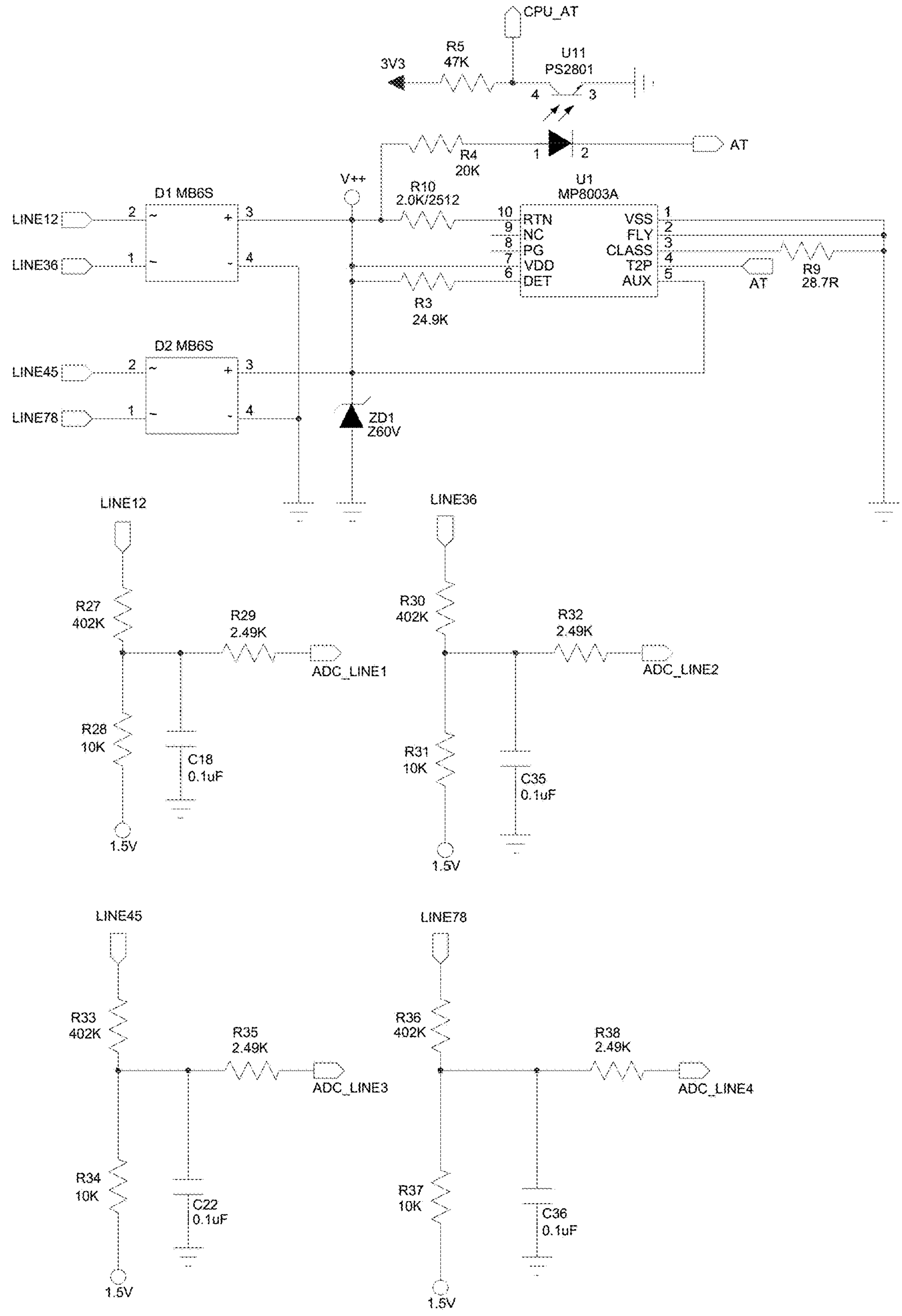
FIG. 7 is a circuit diagram of a switch detection module in the present disclosure.
Figure 8:
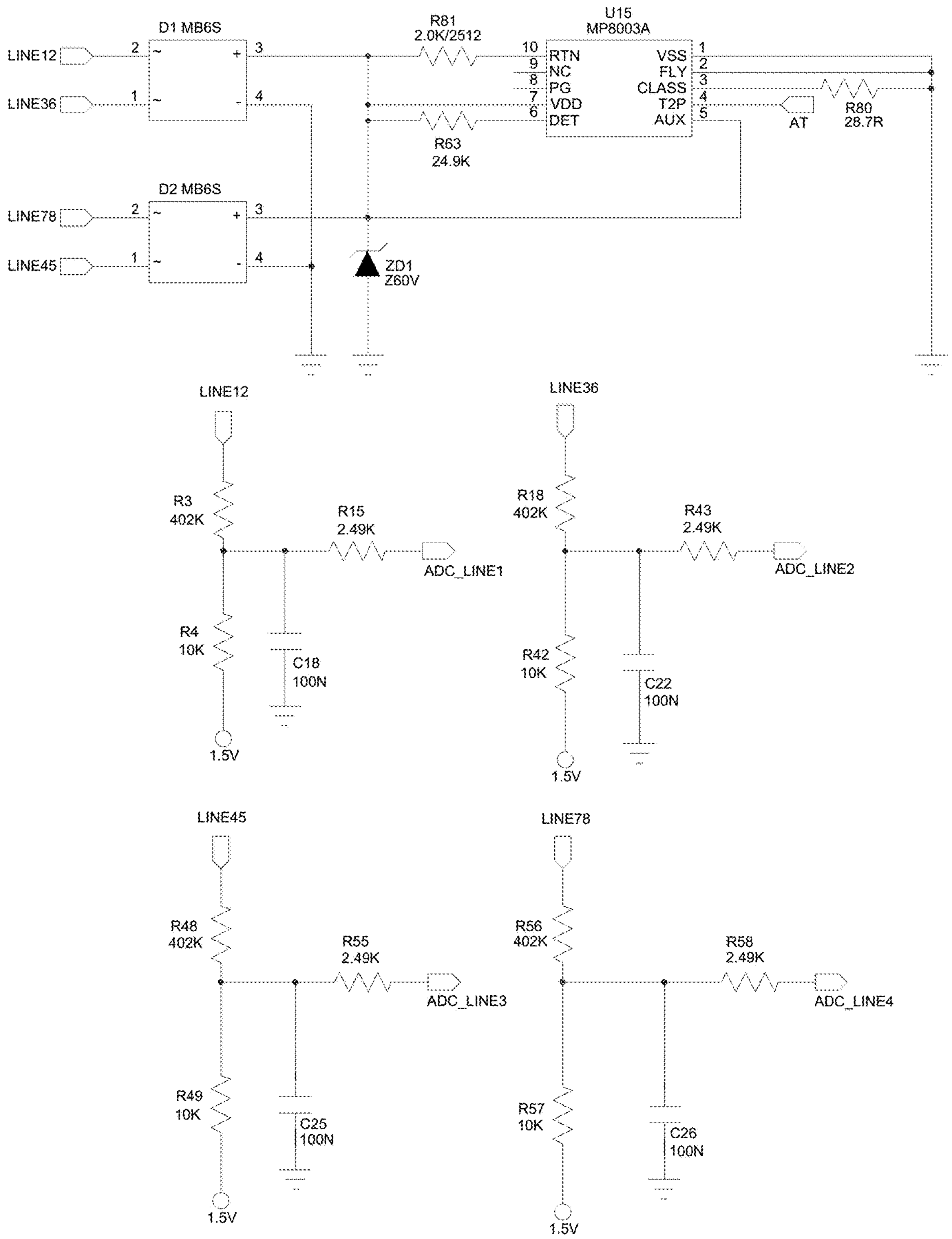
FIG. 8 is a circuit diagram of another switch detection module in the present disclosure.
Figure 9:
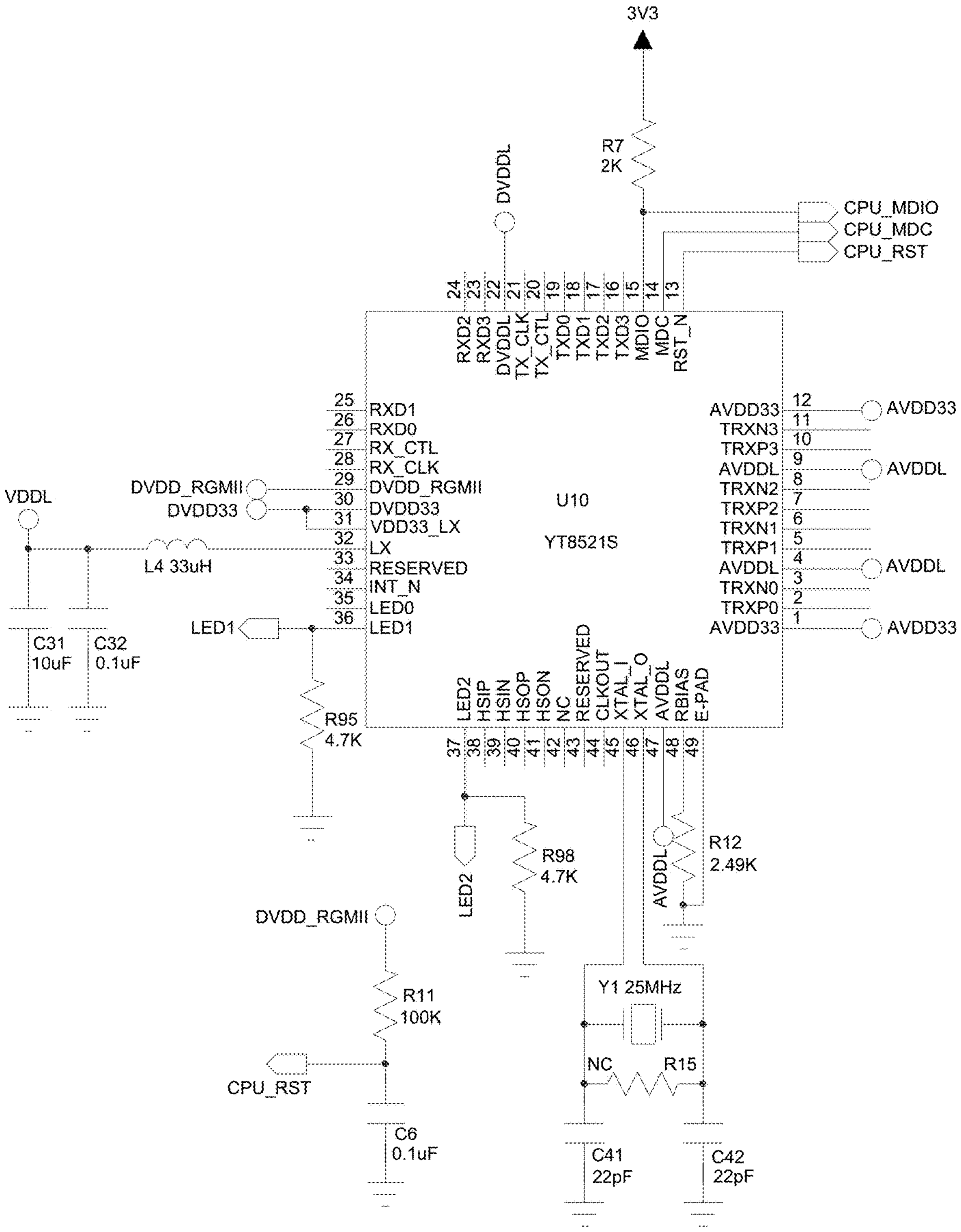
FIG. 9 is a circuit diagram of the PHY unit in the present disclosure.
Figure 10:
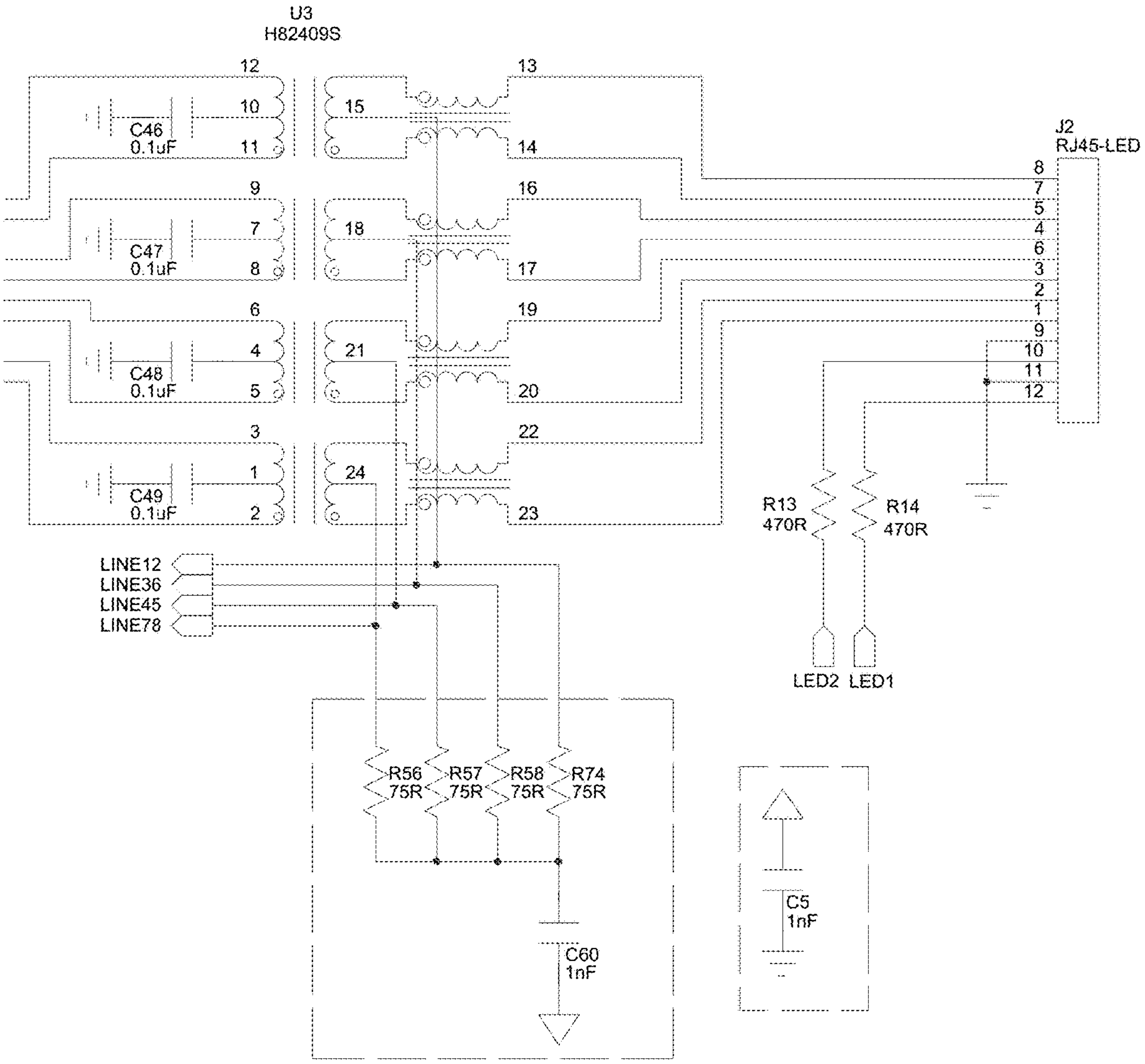
FIG. 10 is a circuit diagram of the network transformer in the present disclosure.

Further, regarding the aforementioned four branches of switch voltage detection modules, the following is illustrated as an example of one branch in FIG. 7. This branch of the switch voltage detection module includes a resistor R27 and a resistor R28, a port of the resistor R27 is connected to a first port and a second port of an RJ-45 interface, an opposite port of the resistor R27 is connected to a port of the resistor R28, an opposite port of the resistor R28 is connected to a +1.5V power supply, and a common port between the resistor R27 and the resistor R28 is connected to a data port of the central control module with ADC function. The second branch of the switch voltage detection module is connected to a third port and a sixth port of the RJ-45 interface, the third branch of the switch voltage detection module is connected to a fourth port and a fifth port of the RJ-45 interface, and the fourth branch of the switch voltage detection module is connected to a seventh port and an eighth port of the RJ-45 interface. The switch detection module is used to obtain voltage from the switch for testing the volts measured from the switch and additionally determining if the passed voltage meets whichever standard for PSE power supply.

In an optional implementation, for the multi-functional network tester with the optical power module, the optical power module includes an optical power converting module, a red light power control module, and a red light output module, the optical power converting module is connected to the central control module, the red light power control module is connected to the central control module, and the red light output module is connected to the red light power control module.

In the present embodiment, referring to FIG. 21, the optical power converting module includes a fiber-optic input interface J5, a channel selector U14, a primary amplifier U17, a secondary amplifier U18, and an analog-to-digital converter U22, a port of the fiber-optic input interface J5 is grounded, an opposite port of the fiber-optic input interface J5 is connected to an inverting input port of the primary amplifier U17 and is connected to a port X0, a port X1, a port X2, a port X3, a port Y0, a port Y1, a port Y2, and a port Y3 of the channel selector U14 via different resistors, the port X0 is short-circuited to the port Y0, the port X1 is short-circuited to the port Y1, the port X2 is short-circuited to the port Y2, the port X3 is short-circuited to the port Y3, a channel-selecting input port of the channel selector U14 is connected to a data port of the central control module, an I/O port Y of the channel selector U14 is connected to an output port of the primary amplifier U17, an I/O port X of the channel selector U14 is connected to an input port of the analog-to-digital converter U22, an output port of the analog-to-digital converter U22 is connected to a data port of the central control module, so that a signal received by the analog-to-digital converter U22 is converted to a digital signal to be transmitted to the central control module, the gain resistance connected to the primary amplifier U17 may be controlled by the channel selector U14, the gain amplification of the primary amplifier U17 may be controlled according to the gain resistance, an output port of the primary amplifier U17 is connected to an input port of the secondary amplifier U18, so that the signal is output to the central control module through a secondary amplification of the secondary amplifier U18, and an output port of the secondary amplifier U18 is connected to a data port of the central control module. In the present embodiment, the primary amplifier U17 and the secondary amplifier U18 adopt an amplifier of model OPA348 respectively.

In the present embodiment, referring to FIG. 24, the red light power control module includes a triode Q11 and an MOS transistor Q81, a base of the triode Q11 is connected to a data port of the central control module, the central control module controls the on and off of the triode Q11, an emitter of the triode Q11 is grounded, a collector of the triode Q11 is connected to a gate of the MOS transistor Q81, a source of the MOS transistor Q81 is connected to a +5V power supply, and a drain of the MOS transistor Q81 is connected to a red light output module.

In the present embodiment, referring to FIG. 23, the red light output module includes a triode Q61, an output interface J4, and a reference voltage triode U20, a drain of the MOS transistor Q81 is connected to a port of the output interface J4, an opposite port of the output interface J4 is connected to a collector of the triode Q61, an emitter of the triode Q61 is grounded, a base of the triode Q61 is connected to a drain of the MOS transistor Q81 via a resistor R114, the base of the triode Q61 is connected to a negative electrode of the reference voltage triode U20, and a positive electrode of the reference voltage triode U20 is grounded.

Figure 6:
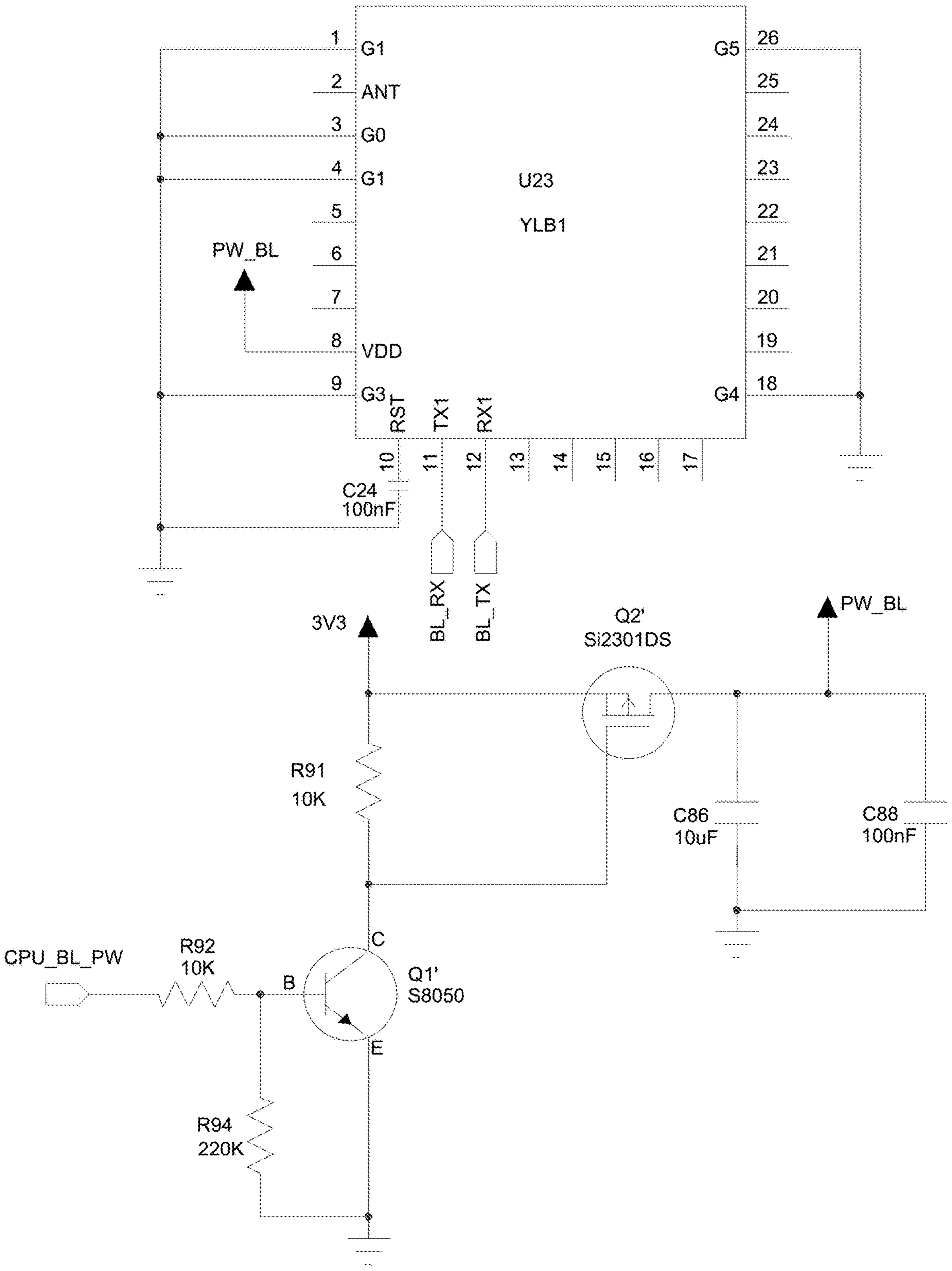
FIG. 6 is a circuit diagram of the bluetooth module in the present disclosure.

In an optional implementation, for the multi-functional network tester with the optical power module, the multi-functional network tester further includes a bluetooth module, and please refer to FIG. 6 for the specific circuit diagram of the bluetooth module. Referring to FIG. 6, the bluetooth module adopts a single-point bluetooth module U23 of model YLB1, the single-point bluetooth module U23 is connected to a data port of the central control module via a serial port, and the multi-functional network tester may communicate with the external via the bluetooth module.

In an optional implementation, for the multi-functional network tester with the optical power module, the multi-functional network tester further includes an optical power supply control module, and please refer to FIG. 22 for the circuit diagram of the optical power supply control module. Referring to FIG. 22, the optical power supply control module includes a linear voltage regulator U19, a power input port of the linear voltage regulator U19 is connected to a +5V power supply, a power output port of the linear voltage regulator U19 is connected to an output port of the analog-to-signal converter U22 via a pull-up resistor, so as to supply a +3.3V power for the analog-to-signal converter U22, and an enable port of the linear voltage regulator U19 is connected to a data port of the central control module.

In an optional implementation, the network cable line-alignment module includes a channel selector U8, a channel selector U5, an analog switch U9, and an RJ-45 interface J3, separate I/O ports of the channel selector U8 are connected to branches of the RJ-45 interface J3 respectively, a common I/O port of the channel selector U8 is grounded, a channel-selecting control port and an enable port of the channel selector U8 are connected to data ports of the central control module respectively, separate I/O ports of the channel selector U5 are connected to ports of the RJ-45 interface J3 respectively, a common I/O port of the channel selector U5 is connected to a data port of the central control module, a channel-selecting control port and an enable port of the channel selector U5 are connected to data ports of the central control module, a first I/O port A of the analog switch U9 is connected to the common I/O port of the channel selector U5, a first I/O port B of the analog switch U9 is grounded, a second I/O port A and a second I/O port B of the analog switch U9 are connected to a ground port of the RJ-45 interface J3 respectively, a control port A of the analog switch U9 is connected to a data port of the central control module being the same data port also connected to an enable port of the channel selector U5, and a control port B of the analog switch U9 is connected to a data port of the central control module being the same data port also connected to an enable port of the channel selector U8.

Further, for the multi-functional network tester with the optical power module, the network cable line-alignment module further includes a channel selector U4 and a single Schmitt-trigger inverter U6 when the multi-functional network tester comprises the optical power module, wherein separate I/O ports of the channel selector U4 are connected to ports of the RJ-45 interface respectively, a common I/O port of the channel selector U4 is connected to a port A of the single Schmitt-trigger inverter U6, a port Y of the single Schmitt-trigger inverter U6 is connected to a data port of the central control module, and the port A of the single Schmitt-trigger inverter U6 is connected to the port Y thereof via a resistor R52. In the present embodiment, the channel selector U4, the channel selector U5, and the channel selector U8 adopt channel selector chips of model 74LV4051PW, and the analog switch U9 adopts an analog switch chip of model CD4066. Other chips with the same function may also be used instead in specific implementations.

It should be noted that: for the multi-functional network tester with the optical power module, please refer to FIGS. 14-15, 17 for the circuit diagram of the network cable line-alignment module, in which FIG. 15 is the circuit diagram of the network cable line-alignment interface including in the network cable line-alignment module, FIG. 17 is the circuit diagram of the channel selector U4 and the single Schmitt-trigger inverter U6 including in the network cable line-alignment module. For the multi-functional network tester with the multimeter module, please refer to FIG. 16 for the circuit diagram of the network cable line-alignment module.

In an optional implementation, for the multi-functional network tester with the optical power module, please refer to FIG. 12 for the specific circuit diagram of the line-finding module including therein. Referring to FIG. 12, a port Y3 and a port Y4 of the line driver U2 are connected to an interface J8, the port Y4 of the line driver U2 is connected to an RJ-45 interface J6, a port A1 of the line driver U2 is connected to a +5V power supply, a port A2 of the line driver U2 is grounded, a port A3 of the line driver U2 is connected to a +5V power supply via a resistor R77 and to a collector of a triode Q51, an emitter of the triode Q51 is grounded, a port A4 of the line driver U2 is connected to a base of the triode Q51, a +5V power supply via a resistor R82, and a collector of a triode Q41, an emitter of the triode Q41 is grounded, and a base of the triode Q41 is connected to a common I/O port of the central control module, a port OE1 and a port OE2 of the line driver U2 are connected to a +5V power supply via a resistor R61 respectively, a port OE3 and a port OE4 of the line driver U2 are connected to a +5V power supply via a resistor R76 respectively, and the port OE3 and the port OE4 of the line driver U2 are connected to a collector of a triode Q31 respectively, an emitter of the triode Q31 is grounded, and a base of the triode Q31 is connected to a common I/O port of the central control module.

In an optional implementation, for the multi-functional network tester with the multimeter module, please refer to the FIG. 13 for the specific circuit diagram of the line-finding module including therein. Referring to FIG. 13, the line-finding module includes a triode Q32, a triode Q42, a triode Q52, a triode Q15, a triode Q16, and a triode Q17, a base of the triode Q32 is connected to a data port of the central control module, an emitter of the triode Q32 is grounded, a collector of the triode Q32 is connected to a +8V power supply via a resistor R62, a base of the triode Q42 is connected to the collector of the triode Q32, a collector of the triode Q42 is connected to +8V power supply, an emitter of the triode Q42 is connected to an emitter of the triode Q52, a collector of the triode Q52 is grounded, a base of the triode Q52 is connected to the collector of the triode Q32, the emitter of the triode Q42 is connected to third, sixth, seventh, eighth ports of an RJ-45 interface, a base of the triode Q17 is connected to a data port of the central control module, an emitter of the triode Q17 is grounded, a collector of the triode Q17 is connected to a +8V power supply via a resistor R97, a base of the triode Q15 is connected to the collector of the triode Q17, a collector of the triode Q15 is connected to a +8V power supply, an emitter of the triode Q15 is connected to an emitter of the triode Q16, a collector of the triode Q16 is grounded, a base of the triode Q16 is connected to the collector of the triode Q17, and the emitter of the triode Q15 and the emitter of the triode Q16 are connected to first, second, fourth, fifth, and ground ports of the RJ-45 interface.

Further, as shown in FIG. 13, a first RC filter module is series-connected between the base of the triode Q32 and a data port of the central control module, the first RC filter module includes a resistor R32 and a capacitor C37 connected in parallel, a second RC filter module is series-connected between the base of the triode Q17 and a data port of the central control module, and the second RC filter module includes a resistor R28 and a capacitor C36 connected in parallel.

In an optional embodiment, the power supply module of the multi-functional network tester includes a USB interface, a lithium battery charging management chip U7, a lithium battery, a DC-DC boost chip U21, and a voltage regulator chip U12, the USB interface is connected to the lithium battery charging management chip U7, the lithium battery is charged through the USB interface, the lithium battery is connected to the lithium battery charging management chip U7, the lithium battery is charged through the lithium battery charging management chip U7, the DC-DC boost chip U21 is connected to the lithium battery to boost the output voltage of the lithium battery to +5V for power supply, and the voltage regulator chip U12 is connected to the DC-DC boost chip U21 to regulate the +5V voltage output by the DC-DC boost chip U21 for power supply. In the present embodiment, the power supply module further includes a power management chip U16 and a voltage regulator chip U13, the power management chip U16 steps down the lithium battery voltage to +3.3V for power supply, and the voltage regulator chip U13 steps down the voltage output from the power management chip U16 to +1.5V for power supply. For the multi-functional network tester with the optical power module, please refer to FIG. 18 for the circuit diagram of the power supply module including therein. For the multi-functional network tester with the multimeter module, please refer to FIGS. 19-20 for the circuit diagram of the power supply module including therein.

In an optional implementation, referring to FIG. 25, for the multi-functional network tester with the optical power module, the multimeter module included therein adopts a multimeter specialized chip U17' of model SD7501. The multimeter specialized chip U17' has a built-in data processing function, which is connected to the serial port of the central control module through the serial port for data communication. In specific implementations, the multimeter specialized chip U17' may also be connected to other common I/O ports of the central control module, and communicate through the common I/O ports by simulating serial ports. A data port of the multimeter specialized chip U17' is connected with a gear selection module, referring to FIG. 26, the gear selection module includes a relay REAL1, a triode Q2, a triode Q62, a triode Q7, and a triode Q82, a base of the triode Q82 is connected to a first data port of the multimeter specialized chip U17', an emitter of the triode Q82 is grounded, a collector of the triode Q82 is connected to a first port of a coil of the relay REAL1, a base of the triode Q62 is connected to a second data port of the multimeter specialized chip U17', an emitter of the triode Q62 is connected to a +3.3V power supply, a collector of the triode Q62 is connected to a second port of the coil of the relay REAL1, a base of the triode Q2 is connected to a third data port of the multimeter specialized chip U17', an emitter of the triode Q2 is connected to a +3.3V power supply, a collector of the triode Q2 is connected to the first end of the coil of the relay REAL1, a base of the triode Q7 is connected to a fourth data port of the multimeter specialized chip U17', an emitter of the triode Q7 is grounded, and a collector of the triode Q7 is connected to a second port of the coil of the relay REAL1.

In an optional implementation, the central control module is further connected with a key module for information input.

When using the multi-functional network tester with the optical power module relating to the present disclosure, the optical signal is converted into an analog electrical signal through the optical power converter and input to interface J5 to achieve the measurement of optical power. Evidently, the compatibility of the optical power measurement and multi-functional network tester is achieved by means of the multi-functional network tester with the optical power module in the present disclosure, which is able to process the optical signals and read the processed data to achieve the measurement of the optical power.

When using the multi-functional network tester with the multimeter module related in the present disclosure, the instruction recognition and control, deployment of specific baud rate and frame header, switching different frame functions and frame parameters to control the gear switching and the corresponding data acquisition of the multimeter functions are achieved by using serial communication of microcontroller, and the resulting data are transmitted to the microcontroller and correspondingly shown on the display after data decoding. The data decoding and display control of the multimeter chip is not performed when the multimeter function is inactive, and only the test control of the multi-function network testing function is performed. Evidently, the multi-functional network tester with multimeter module integrates the multimeter function with other multi-functional network test functions in the present disclosure, allowing the use of a single instrument to fulfill all needs. The compatibility of the multi-functional network tester and the multimeter module is achieved in the present disclosure, which achieves instruction recognition between multimeter chips, control and data reading by means of the MCU serial communication port. The data tested by the multimeter chips is communicated to the MCU through the serial port for decoding, and is presented correspondingly on the display.

In summary, it is achieved that the optical power measurement/multimeter function and multi-functional network tester are combined in one unit in the present disclosure, which provides a more convenient and quicker practical tool for the engineers of network installation and maintenance, which enables the engineers of network installation and maintenance to carry less test instruments.

The invention claimed is:

1. A multi-functional network tester, comprising a central control module, a power module, and one or more of a network cable length measurement module, a line-finding module, a switch detection module, and a network cable line-alignment module, wherein the multi-functional network tester further comprises an optical power module or a multimeter module, the network cable length measurement module, the line-finding module, the switch detection module and/or the network cable line-alignment module are connected to the central control module respectively, the optical power module or the multimeter module is connected to the central control module, and the power module is used for power supply, wherein the optical power module comprises an optical power converting module, a red light power control module, and a red light output module, the optical power converting module is connected to the central control module, the red light power control module is connected to the central control module, and the red light output module is connected to the red light power control module.

2. The multi-functional network tester according to claim 1, wherein the central control module is connected with a battery voltage sampling module, the battery voltage sampling module comprises a first resistor and a second resistor connected in series, a port of the first resistor is connected to a positive electrode of a lithium battery, an opposite port of the first resistor is connected to a port of the second resistor, an opposite port of the second resistor is grounded, and a common port between the first resistor and the second resistor is connected to an I/O port of the central control module with ADC function.

3. The multi-functional network tester according to claim 1, wherein the network cable length measurement module comprises a PHY unit, a network transformer U3, and an RJ-45 interface J2, a data port of the PHY unit is connected to the central control module, the network transformer U3 is connected to a signal output port of the PHY unit, the RJ-45 interface J2 is connected to a signal input port of the network transformer U3, and a center tap of the network transformer U3 is connected to an I/O port of the central control module.

4. The multi-functional network tester according to claim 1, wherein the optical power converting module comprises a fiber-optic input interface J5, a channel selector U14, a primary amplifier U17, a secondary amplifier U18, and an analog-to-digital converter U22, a port of the fiber-optic input interface J5 is grounded, an opposite port of the fiber-optic input interface J5 is connected to an inverting input port of the primary amplifier U17 and is connected to a port X0, a port X1, a port X2, a port X3, a port Y0, a port Y1, a port Y2, and a port Y3 of the channel selector U14 via different resistors, the port X0 is short-circuited to the port Y0, the port X1 is short-circuited to the port Y1, the port X2 is short-circuited to the port Y2, the port X3 is short-circuited to the port Y3, a channel selecting input port of the channel selector U14 is connected to a data port of the central control module, an I/O port Y of the channel selector U14 is connected to an output port of the primary amplifier U17, an I/O port X of the channel selector U14 is connected to an input port of the analog-to-digital converter U22, an output port of the analog-to-digital converter U22 is connected to a data port of the central control module, an output port of the primary amplifier U17 is connected to an input port of the secondary amplifier U18, and an output port of the secondary amplifier U18 is connected to a data port of the central control module.

5. The multi-functional network tester according to claim 1, wherein the red light power control module comprises a triode Q11 and an MOS transistor Q81, a base of the triode Q11 is connected to a data port of the central control module, an emitter of the triode Q11 is grounded, a collector of the triode Q11 is connected to a gate of the MOS transistor Q81, a source of the MOS transistor Q81 is connected to a +5V power supply, and a drain of the MOS transistor Q81 is connected to a red light output module.

6. The multi-functional network tester according to claim 5, wherein the red light output module comprises a triode Q61, an output interface J4, and a reference voltage triode U20, a drain of the MOS transistor Q81 is connected to a port of the output interface J4, an opposite port of the output interface J4 is connected to a collector of the triode Q61, an emitter of the triode Q61 is grounded, a base of the triode Q61 is connected to a drain of the MOS transistor Q81 via a resistor R114, the base of the triode Q61 is connected to a negative electrode of the reference voltage triode U20, and a positive electrode of the reference voltage triode U20 is grounded.

7. The multi-functional network tester according to claim 4, further comprising an optical power supply control module, wherein the optical power supply control module comprises a linear voltage regulator U19, a power input port of the linear voltage regulator U19 is connected to a +5V power supply, a power output port of the linear voltage regulator U19 is connected to an output port of the analog-to-signal converter U22 via a pull-up resistor, and an enable port of the linear voltage regulator U19 is connected to a data port of the central control module.

8. The multi-functional network tester according to claim 1, wherein the network cable line-alignment module comprises a channel selector U8, a channel selector U5, an analog switch U9, and an RJ-45 interface J3, separate I/O ports of the channel selector U8 are connected to branches of the RJ-45 interface J3 respectively, a common I/O port of the channel selector U8 is grounded, a channel selecting control port and an enable port of the channel selector U8 are connected to data ports of the central control module respectively, separate I/O ports of the channel selector U5 are connected to ports of the RJ-45 interface J3 respectively, a common I/O port of the channel selector U5 is connected to a data port of the central control module, a channel-selecting control port and an enable port of the channel selector U5 are connected to data ports of the central control module, a first I/O port A of the analog switch U9 is connected to the common I/O port of the channel selector U5, a first I/O port B of the analog switch U9 is grounded, a second I/O port A and a second I/O port B of the analog switch U9 are connected to a ground port of the RJ-45 interface J3 respectively, a control port A of the analog switch U9 is connected to a data port of the central control module being the same data port also connected to an enable port of the channel selector U5, and a control port B of the analog switch U9 is connected to a data port of the central control module being the same data port also connected to an enable port of the channel selector U8; the network cable line-alignment module further comprises a channel selector U4 and a single Schmitt-trigger inverter U6 when the multi-functional network tester comprises the optical power module, wherein separate I/O ports of the channel selector U4 are connected to ports of the RJ-45 interface respectively, a common I/O port of the channel selector U4 is connected to a port A of the single Schmitt-trigger inverter U6, a port Y of the single Schmitt-trigger inverter U6 is connected to a data port of the central control module, and the port A of the single Schmitt-trigger inverter U6 is connected to the port Y thereof via a resistor R52.

9. The multi-functional network tester according to claim 1, wherein: when the multi-functional network tester comprises the optical power module, the line-finding module adopts a line driver U2, a port Y3 and a port Y4 of the line driver U2 are connected to an interface J8 respectively, the port Y4 of the line driver U2 is connected to an RJ-45 interface J6, a port A1 of the line driver U2 is connected to a +5V power supply, a port A2 of the line driver U2 is grounded, a port A3 of the line driver U2 is connected to a +5V power supply via a resistor R77 and to a collector of a triode Q51, an emitter of the triode Q51 is grounded, a port A4 of the line driver U2 is connected to a base of the triode Q51, a +5V power supply via a resistor R82, and a collector of a triode Q41, an emitter of the triode Q41 is grounded, and a base of the triode Q41 is connected to a common I/O port of the central control module, a port OE1 and a port OE2 of the line driver U2 are connected to a +5V power supply via a resistor R61 respectively, a port OE3 and a port OE4 of the line driver U2 are connected to a +5V power supply via a resistor R76 respectively, and the port OE3 and the port OE4 of the line driver U2 are connected to a collector of a triode Q31 respectively, an emitter of the triode Q31 is grounded, and a base of the triode Q31 is connected to a common I/O port of the central control module.

10. The multi-functional network tester according to claim 1, wherein: when the multi-functional network tester comprises the multimeter module, the line-finding module comprises a triode Q32, a triode Q42, a triode Q52, a triode Q15, a triode Q16, and a triode Q17, a base of the triode Q32 is connected to a data port of the central control module, an emitter of the triode Q32 is grounded, a collector of the triode Q32 is connected to a +8V power supply via a resistor R62, a base of the triode Q42 is connected to the collector of the triode Q32, a collector of the triode Q42 is connected to +8V power supply, an emitter of the triode Q42 is connected to an emitter of the triode Q52, a collector of the triode Q52 is grounded, a base of the triode Q52 is connected to the collector of the triode Q32, the emitter of the triode Q42 is connected to third, sixth, seventh, eighth ports of an RJ-45 interface, a base of the triode Q17 is connected to a data port of the central control module, an emitter of the triode Q17 is grounded, a collector of the triode Q17 is connected to a +8V power supply via a resistor R97, a base of the triode Q15 is connected to the collector of the triode Q17, a collector of the triode Q15 is connected to a +8V power supply, an emitter of the triode Q15 is connected to an emitter of the triode Q16, a collector of the triode Q16 is grounded, a base of the triode Q16 is connected to the collector of the triode Q17, and the emitter of the triode Q15 and the emitter of the triode Q16 are connected to first, second, fourth, fifth, and ground ports of the RJ-45 interface.

11. The multi-functional network tester according to claim 10, wherein a first RC filter module is series-connected between the base of the triode Q32 and a data port of the central control module, the first RC filter module comprises a resistor R32 and a capacitor C37 connected in parallel, a second RC filter module is series-connected between the base of the triode Q17 and a data port of the central control module, and the second RC filter module comprises a resistor R28 and a capacitor C36 connected in parallel.

12. The multi-functional network tester according to claim 1, wherein the switch detection module comprises a rectifier bridge D1, a rectifier bridge D2, an interface controller U15, and four branches of switch voltage detection modules, a first input port of the rectifier bridge D1 is connected to first and second ports of an RJ-45 interface, a second input port of the rectifier bridge D1 is connected to third and sixth ports of the RJ-45 interface, a first input port of the rectifier bridge D2 is connected to fourth and fifth ports of the RJ-45 interface, a second input port of the rectifier bridge D2 is connected to seventh and eighth ports of the RJ-45 interface, output ports of both the rectifier bridge D1 and rectifier bridge D2 are connected to a signal input port of the interface controller U15, a signal output port of the interface controller U15 is connected to a data port of the central control module, four branches of switch voltage detection modules adopt voltage-dividing resistors connected in series respectively, and a common port of the voltage-dividing resistors is connected to a data port with ADC function.

13. The multi-functional network tester according to claim 1, wherein the multimeter module adopts a multimeter specialized chip U17', serial interfaces of the multimeter specialized chip U17' is connected to serial interfaces of the central control module, a data port of the multimeter specialized chip U17' is connected with a gear selection module, the gear selection module comprises a relay REAL1, a triode Q2, a triode Q62, a triode Q7, and a triode Q82, a base of the triode Q82 is connected to a first data port of the multimeter specialized chip U17', an emitter of the triode Q82 is grounded, a collector of the triode Q82 is connected to a first port of a coil of the relay REAL1, a base of the triode Q62 is connected to a second data port of the multimeter specialized chip U17', an emitter of the triode Q62 is connected to a +3.3V power supply, a collector of the triode Q62 is connected to a second port of the coil of the relay REAL1, a base of the triode Q2 is connected to a third data port of the multimeter specialized chip U17', an emitter of the triode Q2 is connected to a +3.3V power supply, a collector of the triode Q2 is connected to the first end of the coil of the relay REAL1, a base of the triode Q7 is connected to a fourth data port of the multimeter specialized chip U17', an emitter of the triode Q7 is grounded, and a collector of the triode Q7 is connected to a second port of the coil of the relay REAL1.

14. The multi-functional network tester according to claim 1, wherein the central control module is further connected with a key module.

15. The multi-functional network tester according to claim 1, wherein the power module comprises a USB interface, a lithium battery charging management chip U7, a lithium battery, and a DC-DC boost chip U21, the USB interface is connected to the lithium battery charging management chip U7, the lithium battery is charged via the USB interface, the lithium battery is connected to the lithium battery charging management chip U7, the DC-DC boost chip U21 is connected to the lithium battery, the power module further comprises a power management chip U16 and a voltage regulator chip U13, the power management chip U16 regulates a voltage of the lithium battery to +3.3V for power supply, and the voltage regulator chip U13 regulates the voltage output by the power management chip U16 to +1.5V for power supply.

* * * * *